United States Patent [19]

Tomita

[11] 4,238,808
[45] Dec. 9, 1980

[54] TAPE STOP DETECTING MECHANISM

[75] Inventor: Seiji Tomita, Yokohama, Japan

[73] Assignee: Tokyo Shibaura Denki Kabushiki Kaisha, Kawasaki, Japan

[21] Appl. No.: 6,753

[22] Filed: Jan. 26, 1979

[30] Foreign Application Priority Data

Feb. 1, 1978 [JP] Japan .................................. 53-9238
Feb. 17, 1978 [JP] Japan .................................. 53-17251

[51] Int. Cl.³ ...................... G11B 15/44; G11B 15/32; G11B 15/50; G11B 21/24
[52] U.S. Cl. ................................. 360/74.2; 242/191; 360/71; 360/96.1; 360/105; 360/109
[58] Field of Search ...................... 360/74.2, 74.1, 71, 360/105, 90, 93, 96.1, 96.3, 109, 106; 242/201-202, 208-210, 198-200, 191, 57

[56] References Cited

U.S. PATENT DOCUMENTS

| | | | |
|---|---|---|---|
| 3,409,239 | 11/1968 | Siebert | 360/74.4 |
| 3,480,230 | 11/1969 | Hosono et al. | 242/191 |
| 3,653,607 | 4/1972 | Lambeek et al. | 242/191 |
| 3,705,273 | 12/1972 | Noyori et al. | 360/74.4 |
| 3,861,620 | 1/1975 | Sekiguchi | 242/201 |
| 4,010,918 | 3/1977 | Kato | 242/191 |

FOREIGN PATENT DOCUMENTS 46-8270 3/1971 Japan .
52-44004 10/1977 Japan .

Primary Examiner—Alfred H. Eddleman
Attorney, Agent, or Firm—Cushman, Darby & Cushman

[57] ABSTRACT

A tape recorder comprises an automatic reverse system for detecting a stop of rotation of one of reel holders in one direction by a rotating member on said one reel holder and enabling said one reel holder to rotate in the other direction. The automatic reverse system includes a tape stop detecting mechanism for detecting a stop of rotation of said rotating member, said detecting mechanism being disposed correspondingly to the rotating members, a detector to be shifted from a non-detecting position to a detecting position when the rotation of said member is stopped, a rotation engaging member provided in association with said detector, an engaging lever for engaging said detector with said rotation engaging member relatively to shift the same when said detector is shifted to said detecting position, and a reverse mechanism operated by the relative shift of said detector and rotation engaging member to rotate said reel holders in said other direction.

18 Claims, 52 Drawing Figures

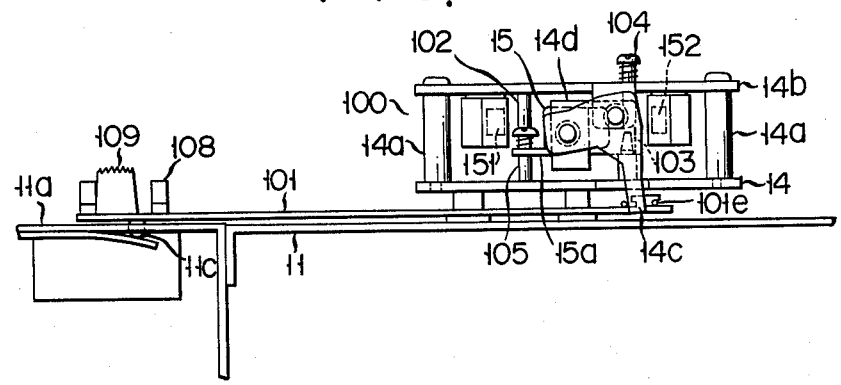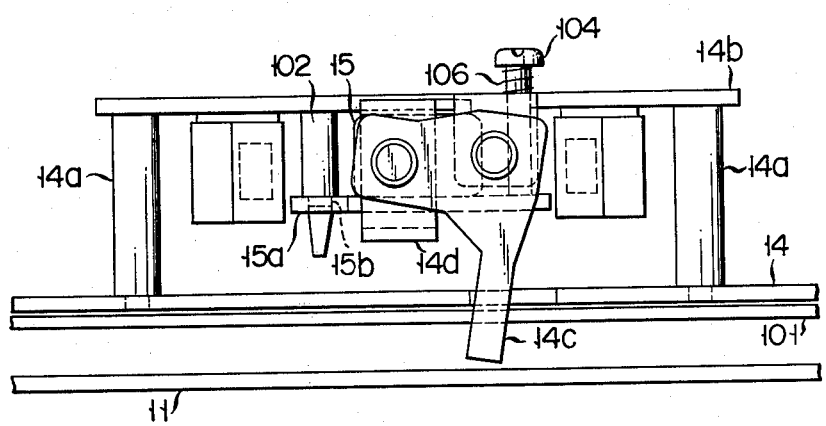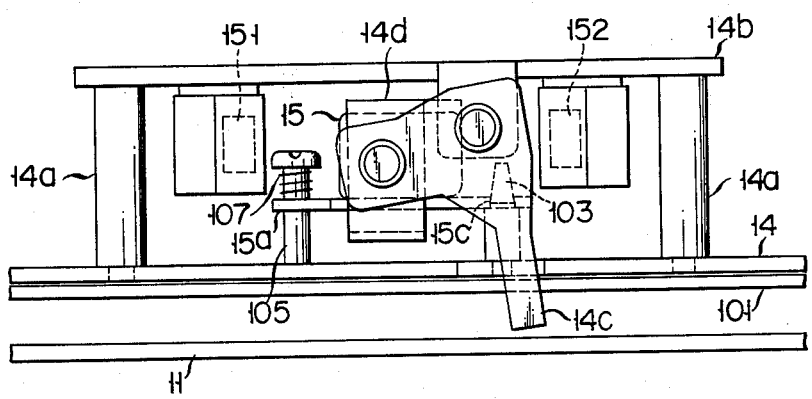

PLAY

PLAY

FF

REW

TAPE STOP DETECTING MECHANISM

BACKGROUND OF THE INVENTION

This invention relates to a portable tape recorder of a cassette type or the like, more specifically to a tape recorder with a full-mechanical automatic reverse system.

As is generally known, systems for tape recorders capable of reciprocative recording or reproducing are called automatic reverse systems. These automatic reverse systems can automatically continue recording or reproducing for a reverse operation without changing the states of tape loading and setting of a control section when the end of a tape is reached in a forward operation, providing special facility for prolonged recording or play-back.

Such automatic reverse systems of prior art type, however, are large-sized, heavy and expensive, requiring high power consumption, because they include an electromagnetic switching mechanism such as solenoid plunger.

Thus, none of these automatic reverse systems could be applied to a portable tape recorder of a cassette type or the like whose requirements include compactness, light weight and low price, as well as low power consumption which is essential because of the use of batteries for power supply.

SUMMARY OF THE INVENTION

Accordingly, the object of this invention is to provide a tape stop detecting mechanism suited for a full-mechanical automatic reverse system of a portable tape recorder of a cassette type or the like that can entirely mechanically achieving automatic reverse operation without employing a solenoid plunger or some other electromagnetic switching mechanism, and capable of easily and satisfactorily detecting a stop of a tape.

BRIEF DESCRIPTION OF THE DRAWINGS

FIGS. 3A to 3J show an automatic shut-off mechanism section of the tape recorder, wherein FIGS. 3A to 3D are plan views showing varied states of the mechanism section, FIG. 3E is a sectional view showing a reel holder and a friction plate, FIG. 3F is a sectional view of a gear mechanism, and FIGS. 3G to 3J are plan views showing varied positions of the gear mechanism;

FIGS. 7A to 7H are plan views showing varied operating states of a head shift mechanism as viewed from various angles;

FIGS. 15 to 17A are plan views showing various modification of the tape end detecting system.

DETAILED DESCRIPTION OF THE PREFERRED EMBODIMENT

Now there will be described an embodiment of this invention with reference to the accompanying drawings.

Figure 1:
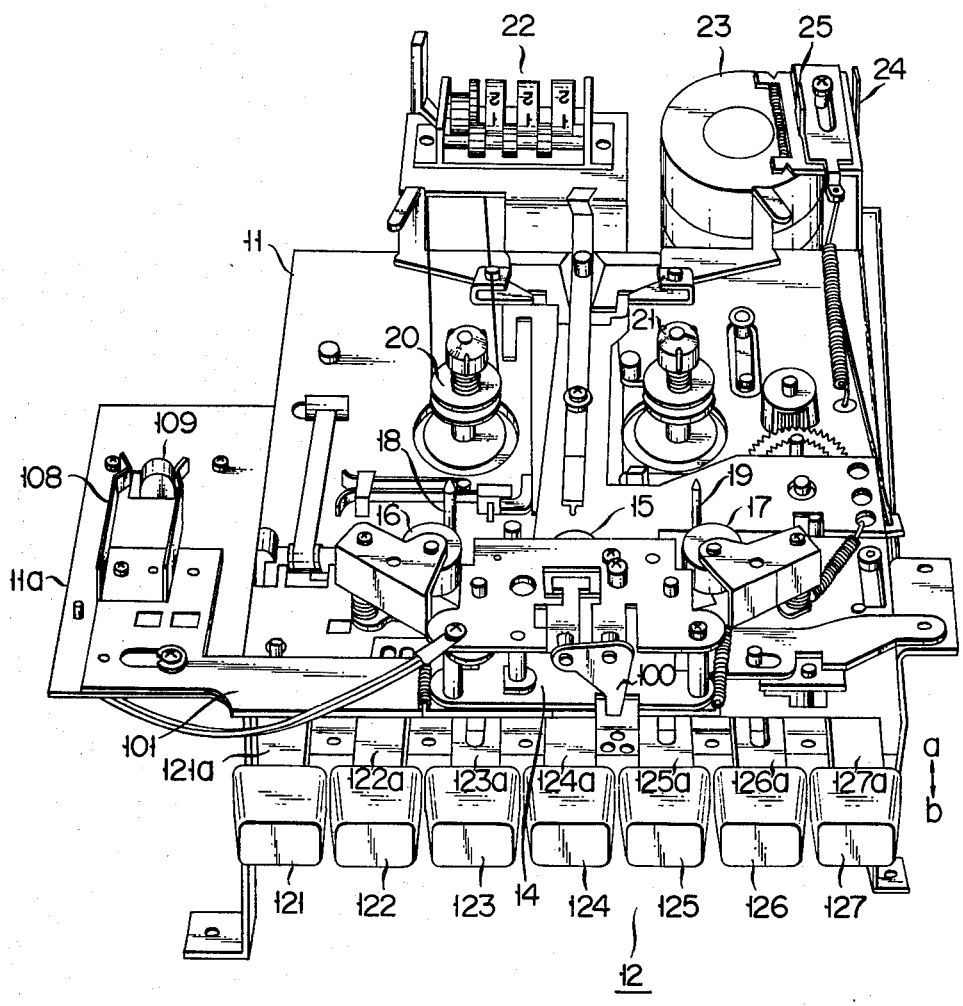
FIG. 1 is a perspective view of a tape recorder according to an embodiment of this invention.

FIG. 1 is a perspective view of a cassette tape recorder having a substantially U-shaped main chassis 11 which is provided with various mechanisms as mentioned later at its longitudinal and traverse portions. There is a control section 12 protruding (downward) as illustrated, in which a STOP control switch 121 for stopping and ejection, a REW control switch 122 for rewinding, a PLAY (R) control switch 123 for reverse play-back or sound reproduction (returning operation), a REC control switch 124 for recording, a PLAY (F) control switch 125 for forward play-back (going operation), an FF control switch 126 for fast forwarding, and a PAUSE control switch 127 for pausing are arranged from left to right as illustrated so that they may be depressed and restored in the directions of arrows a and b respectively. By depressing these control switches 121 to 127, driving systems as mentioned later may be allowed to operate by means of their corresponding control levers 121a to 127a. These control levers 121a to 127a are so arranged as to slide reciprocatively in the directions of arrows a and be under the chassis 11. The levers 122a to 127a, when pressed down, are to be locked to their respective depressed positions, engaging well-known lock mechanisms (not shown). Only the lever 121a of the STOP control switch 121 will never be locked, engaging the lock mechanisms so as to release the other control levers from the locked positions. The PAUSE control switch 127 and its lever 127a, however, operate independently without engaging the lock mechanisms, and engage a known push-push mechanism (not shown) disposed below PLAY control switch, naturally. As for a tape recorder like this invention that is capable of automatic reverse operation, however, it needs to achieve sound reproduction (recording) in both forward and reverse directions, so that it should be provided with two independent PLAY control switches for forward and reverse operations. If only one of these two PLAY control switches is operated, play-back (recording) will be allowed only in its corresponding direction. If both these switches are operated at the same time, then automatic reverse operation will be performed. Normal play-back (recording) may be achieved by operating only the PLAY control switch for the forward operation.

Moreover, the REC control switch 124, when operated in combination with the aforesaid one or two PLAY control switches, drives a recording system by means of its corresponding lever 124a so as to enable one-way recording in the forward or reverse direction or reciprocative recording by automatic reverse. In this case, a different mechanism from an ordinary one is used for the prevention of wrong erasure to comply with any recording conditions, which will be mentioned afterwards.

In FIG. 1, left and right reel holders or pedestals 20 and 21 protrude at a fixed space in the central portion of the chassis 11. These holders are respectively coupled to an automatic shut-off mechanism and a reciprocation switching mechanism as mentioned later. At the top of the drawing of FIG. 1, there are shown a tape counter 22 coupled to the left reel holder 20, a motor 23 as a power source for the driving systems, and control levers 24 and 25 for an automatic reverse frequency limiting mechanism and a manual reverse mechanism as described afterwards.

Figure 2:
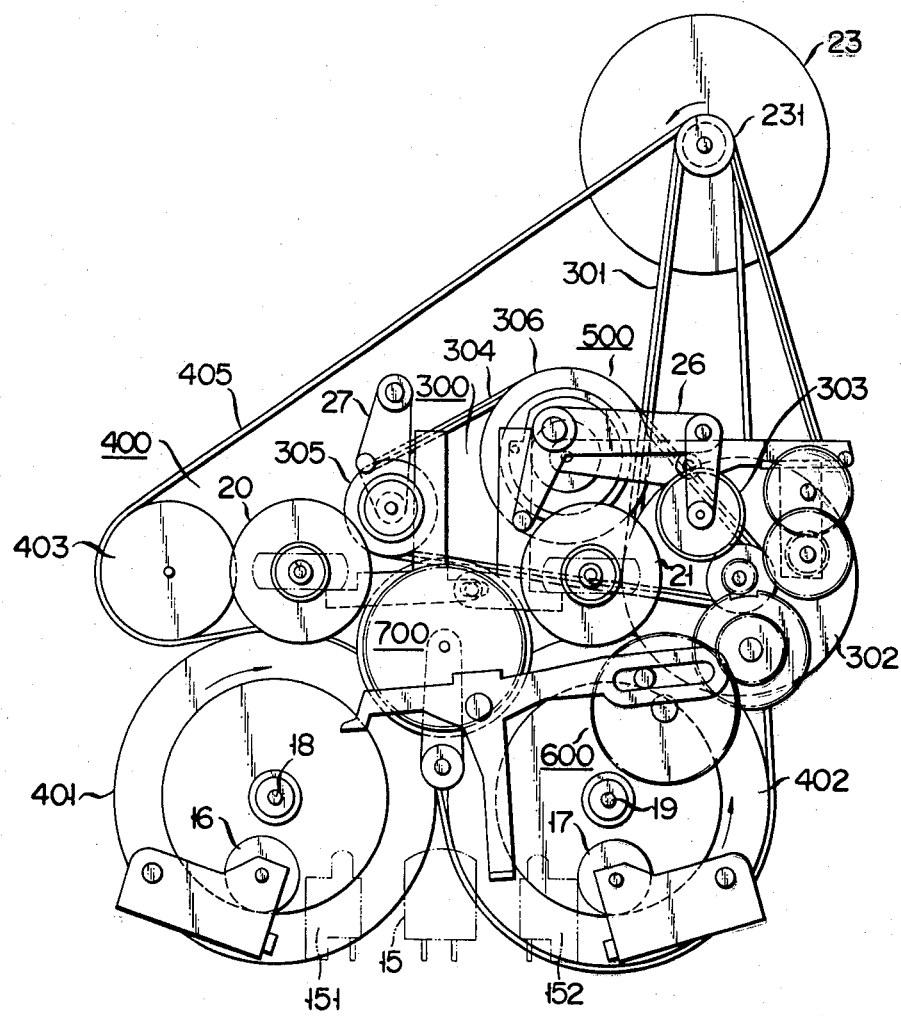
FIG. 2 is a plan view of part of the tape recorder of FIG. 1 excepting a main chassis.
Figure 2:
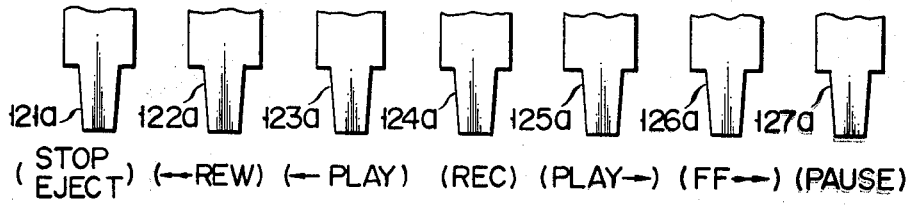

FIG. 2 is an overall plan view of the tape driving mechanism of FIG. 1, with the main chassis 11 removed therefrom to serve the convenience of explanation. This mechanism is particularly characterized in that a (normal-speed) reel driving system 300 is independent of a capstan driving system 400 in a normal-speed driving mechanism section. Accordingly, the capstans are not subject to any direct influence of load fluctuations, so that wow and other characteristics may be improved, and a detecting portion of an automatic shut-off mechanism 500 may be simplified by incorporating it into the same system with the normal-speed reel driving system 300. Namely, a motor pulley 231 mounted on the rotating shaft of the motor 23 is coupled with a large-diameter portion of a central pulley 302 by means of a first belt 301. A right take-up idler 303 is provided so that it can touch and go away from a small-diameter portion of the central pulley 302. As described afterwards, the right take-up idler 303 can also touch and go away from the right reel holder 21 at the same time with the small-diameter portions of the central pulley 302 by means of a link mechanism 26 driven by a right reproducing slider 125b which is coupled to the lever 125a of the PLAY (F) control switch 125 at time of rightward feed.

Figure 4A:
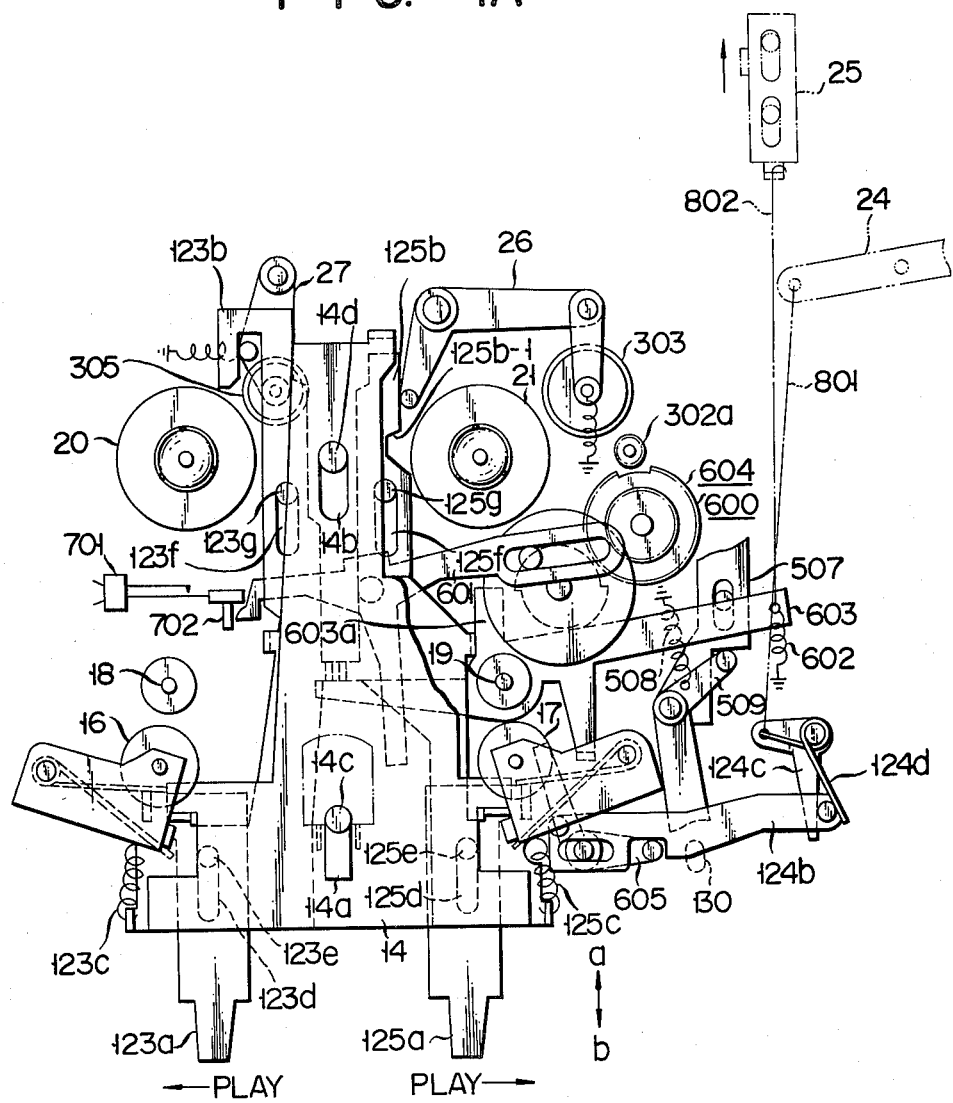
FIGS. 4A to 4C and 5A and 5B are plan views showing varied operating states of an automatic reverse driving section of the tape recorder.

Round the small-diameter portion of the central pulley 302 is a second belt 304 forming a substantially triangular loop with such small-diameter portion as one base angle portion. The belt 304 is further stretched between a left take-up pulley 305 located at the other base angle portion of the triangle opposite to the central pulley 302 and a cam wheel 306 disposed at the vertical angle portion. The left take-up pulley 305 is allowed to touch and go away from the left reel holder 20 by means of a control member 27 driven by a left reproducing slider 123b which is coupled to the lever 123a of the PLAY (R) control switch 123 at time of leftward feed, as described afterwards (FIG. 4A). The cam wheel 306 constitutes the detecting portion of the automatic shut-off mechanism 500 which can, in this case, detect the stop of both the left and right reel holders 20 and 21. This will later be described further in detail.

Furthermore, in FIG. 2, the capstan driving system 400 comprises a pair of left and right flywheels 401 and 402 coupled in the so-called anti-rolling manner by means of a third belt 405 through the motor pulley 231 and a guide pulley 403 for the flywheels. A pair of left and right capstans 18 and 19 as aforesaid protrude coaxially from the centers of their corresponding flywheels 401 and 402. A forward-reverse switching mechanism 600 of the normal-speed tape feed system and a forward-reverse switching mechanism 700 of the high-speed tape feed system as shown in FIG. 2 will later be described in detail.

Besides the aforesaid improvement of wow characteristic, such normal-speed driving mechanism provides advantages that stagble transmission of rotation may be attained because the reel holder drive in either direction can be performed on the intrusion side, and that the motor need not be rotated in the reverse direction, which leads to reduced cost and prolonged life.

As may be seen from the above-described construction, the tape recorder of this invention can perform tape feed in both directions to achieve automatic reverse operation, let alone the ordinary function of a tape recorder. Such ordinary function, of which description will be limited to the essential minimum, may easily be understood from the explanation of the automatic reverse operation. Emphasis will, therefore, be laid on the automatic reverse in the description hereinafter. To begin with, the automatic shut-off mechanism 500 will now be described. This is to be done because it is more convenient first to explain detection of a tape end by the detecting portion of the automatic shut-off mechanism 500, since the automatic reverse operation automatically switches the direction of play-back (recording) by detecting the tape end, as is generally known.

Figure 3A:
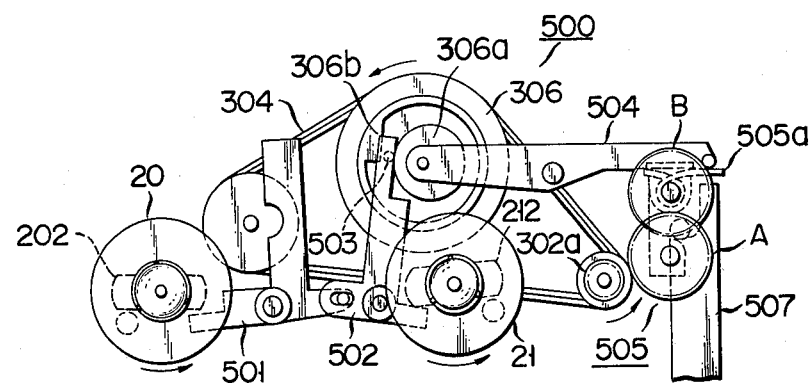
Figure 3B:
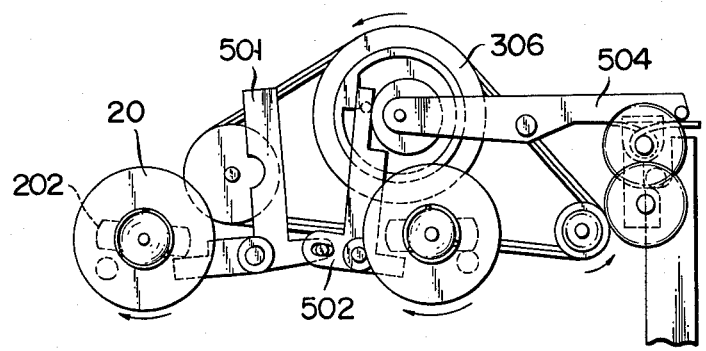
Figure 3C:
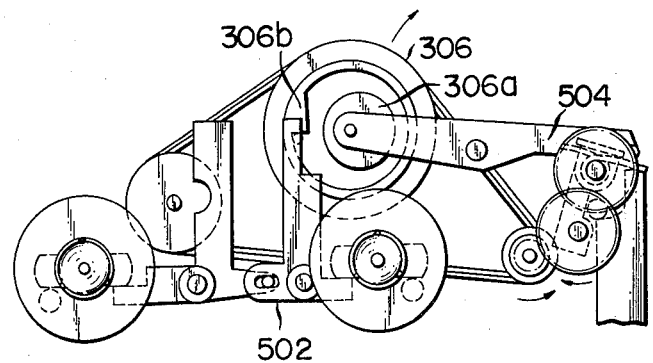
Figure 3D:
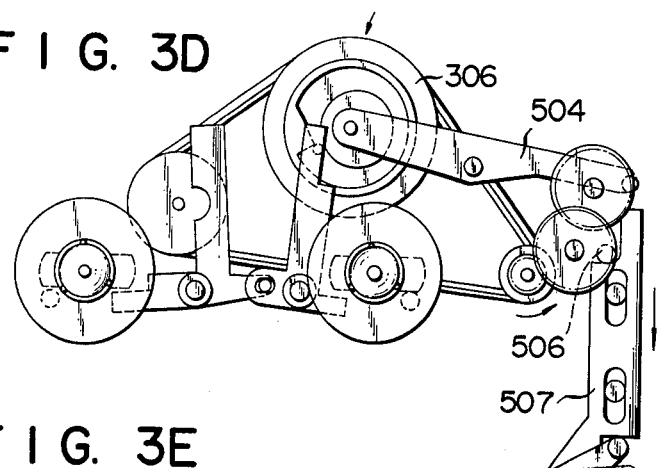
Figure 3E:
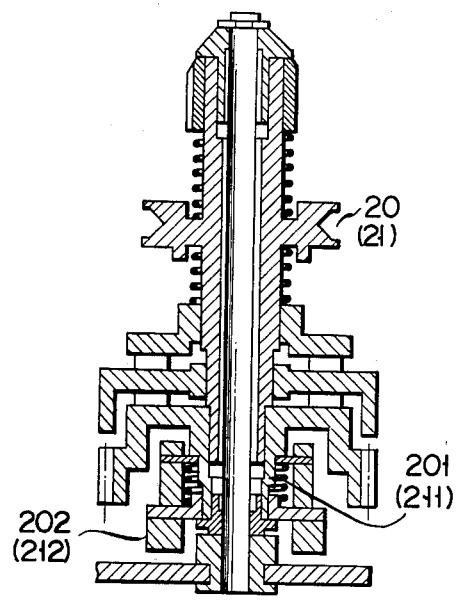
Figure 3F:
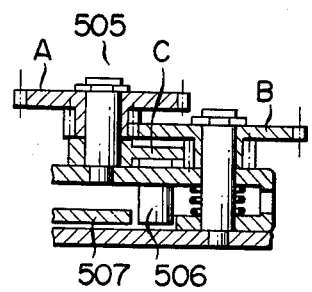
Figures 3G, 3H:
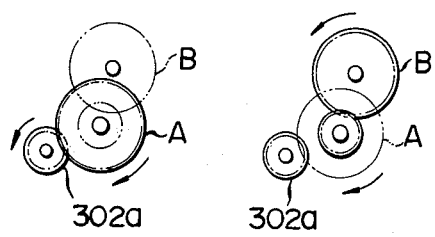
Figures 3I, 3J:
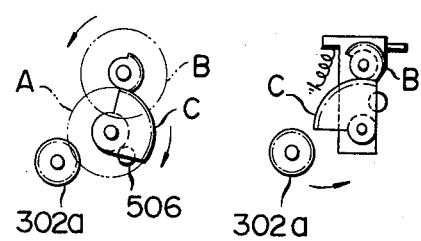

Now let it be supposed that the tape is running to the right or left (where the tape recorder is set to any other operating state than the automatic reverse operation as mentioned later). Then, the automatic shut-off mechanism 500 is in a position as shown in FIG. 3A or 3B. That is, friction mechanism 201 and 211 are provided at the respective lower portions on the left and right reel holders 20 and 21, as shown in FIG. 3E. Further, as shown in FIG. 3A, respective one ends of the bases of left and right substantially T-shaped detection levers 501 and 502 engage friction plates 202 and 212 of the friction mechanism 201 and 211, while the respective other ends of the bases of the plates are coupled with each other with a play left, the central portions of the bases being pivotally attached. In the remaining end of the right detection lever 502, there is downwardly embedded a trace pin 503 which engages and is guided by an inside eccentric cam portion 306a of the cam wheel 306. Thus, when the tape is running to the right (FIG. 3A), clockwise biasing force is always applied to the right detection lever 502 which engages the friction plate 212, accompanying counterclockwise rotation of the right reel holder 21 as indicated by an arrow in FIG. 3A. In consequence, while the tape is running to the right, the right detection lever 502 is being swinged clockwise and counterclockwise round its pivotal point within a narrow range by the trace pin 503 guided by the inside eccentric cam portion 306a of the cam wheel 306. When in this state the tape end is reached and the right reel holder 21 is stopped, the clockwise biasing force is removed from the right detection lever 502, so that the detection lever 502 stops at a position where it is thrust away in the counterclockwise direction by the cam portion 306a, as shown in FIG. 3c. Then, the detection lever 502 is caused to engage an outside projection 306b of the cam wheel 306 which rotates independently of the tape run.

Since the center of the cam wheel 306 is pivotally mounted on one end of a cam lever 504, the cam wheel 306 itself comes to rock clockwise as illustrated round a pivotal pin in the center of the lever 504 in the manner of the so-called planetary motion, by its own turning effort. Thus, a gear mechanism 505, which engages the other end of the cam lever through a torsion spring 505a, gets engaged with a gear 302a coaxial with the small-diameter portion of the central pulley 302. The gear 302a is directly connected to the motor 23 to be the driving source for the so-called automatic shut-off (ASO) operation. FIGS. 3F to 3J show how the gear 302a engages the gear mechanism 505, as well as their functions.

The gear mechanism 505 engaging the cam lever 504 is composed of gears A, B and C, among which the gear A gets engaged with the central pulley gear 302a to receive the turning force. Then, the gear B rotates through a small gear coaxial and integral with the gear A, so that the fan-shaped gear C rotates through a small gear coaxial and integral with the gear B. As a result, a pin 506 attached to the fan-shaped gear C moves a releasing slider 507 downward as shown in FIG. 3D with a force by which the gear C is finally rocked clockwise, thereby releasing the control switches which have been locked by the lock mechanism and stopping the tape recorder.

Thus, the automatic shut-off operation is achieved. In the aforementioned processes, the cam lever 504 is rocked in the clockwise direction and stops at a position where the pin 504a at the right-end portion of the cam lever 504 against the releasing slider 507, so that the cam wheel 306 is on stand-by-state, slipping on the belt 304 where it is (FIG. 3C). When in this state the releasing slider 507 starts to move in the aforesaid manner (this is caused by a time lag in operation attributable to the small gear of the gear B being a notched gear), the cam lever 504 is further rocked clockwise, so that the cam wheel 306 rocks in the same direction. As a result, the engaging surface of the outside projection 306b of the cam wheel 306 is inclined as against the trace pin 503, so that the trace pin 503 moves along the engaging surface automatically to quit the projection 306b. Accordingly, the cam wheel 306 rocks counterclockwise round the pivotal point of the lever 504 by its own turning force to return to its original position (FIG. 3D).

When the tape is running to the left (FIG. 3B), counterclockwise biasing force is always applied to the left detection lever 501 which engages the friction plate 202, accompanying clockwise rotation of the left reel holder 20 as indicated by an arrow in FIG. 3B. Accordingly, the one end of the base of the right detection lever 502, which is coupled with a play left in the aforesaid rightward running, is coupled in place, and finally the same clockwise biasing force of the above case is continually applied to the right detection lever 502. Thus, after this, the operations for the rightward tape run are followed to achieve automatic shut-off operation.

According to such automatic shut-off mechanism 500, the right detection lever 502 and the cam wheel 306 may automatically be released from their reciprocal engagement by the turning force of the cam wheel 306, so that there is no need of a member for releasing the engagement that has been essential to this type of automatic shut-off mechanism. Moreover, the driving source and detection lever for the automatic shut-off operation may freely be arranged, and the detection lever may be axially fixed, improving accuracy and stability of operation. Since the cam wheel 306 forming the detecting portion is rotated by the normal-speed reel driving system 300 and a single belt, stops of both the left and right reel holders 20 and 21 may be detected in common, serving the convenience of the simplification of construction and improvement with respect to the space factor.

The above description has been given on the assumption that the automatic shut-off operation is performed only when the tape end is reached, though the same operation may be performed also when the tape has got entangled, thereby protecting the tape and various mechanical portions.

Now there will be described the automatic reverse operation. FIG. 4A shows the automatic reverse driving system extracted from the drawings of FIGS. 1 and 2. The levers 123a and 125a for the reverse and forward play-back operations are engaged, respectively, with pinch rollers 16 and 17, and left and right reproducing sliders 123b and 125b for controlling the right take-up idler 303 and the head slider 14, by means of springs 123c and 125c. Hereupon, the levers 123a and 125a are allowed to slide reciprocatively in the directions of arrows a and b by the guide pins 123e and 125e engaging slots 123d and 125d as shown in FIG. 4A (same applies to other levers not shown). Also, the head slider 14 and the left and right reproducing sliders 123b and 125b are allowed to slide reciprocatively in the directions of arrows a and b when guide pins 14c, 14d, 123g and 125g get engaged with their corresponding slots 14a, 14b, 123f and 125f.

By the engagement between the springs 123c and 125c, the head slider 14 can be driven to bring the left or right slider 125b or 123b into the driving state, whether you operate the reproducing lever 125a or 123a.

The lock mechanism of the control section 12 used with this type of recorder is to be able to lock one control lever 123a or 125a without releasing the locked state of the other control lever 125a or 123a, whether it is done at the same time when the other control lever is locked or with a time lag. Moreover, the control lever 124 for recording can be locked-together with those levers.

Figure 4B:
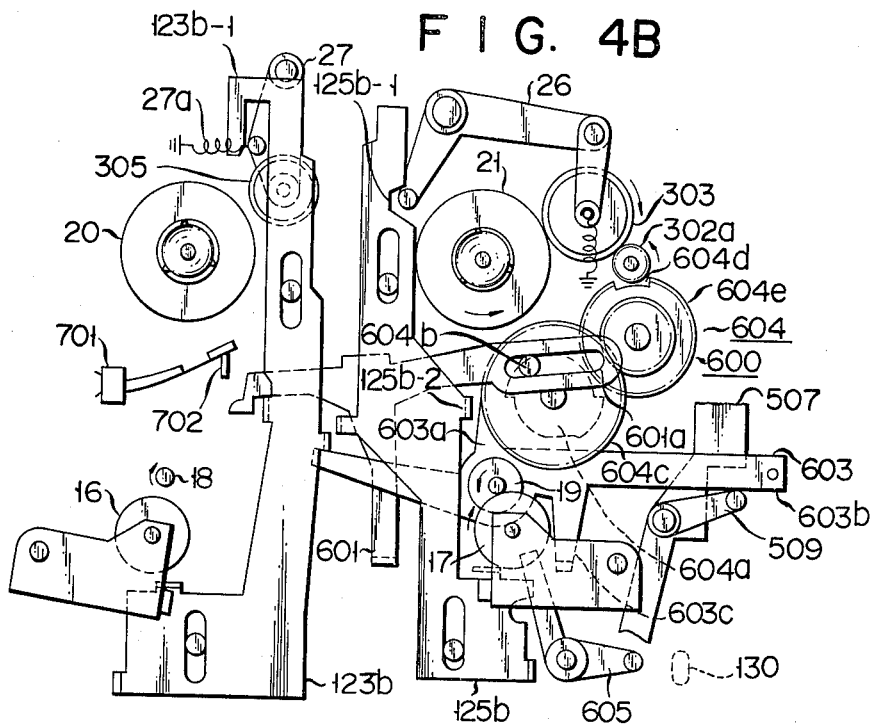

Thus, if the forward and reverse control levers 123a and 125a are locked substantially at the same time by depressing both the PLAY (R) and (F) control switches 123 and 125 for automatic reverse (play-back) operation, both the left and right reproducing sliders 123b and 125b will tend to enter into the drive, as shown in FIGS. 4A and 4B. Then, they hit against a substantially T-shaped reverse driving lever 601 which is rockably disposed between those sliders; one of the sliders is prevented from the entrance to be on stand-by-state, while the other is allowed to enter for play-back in its corresponding direction.

Figure 5A:
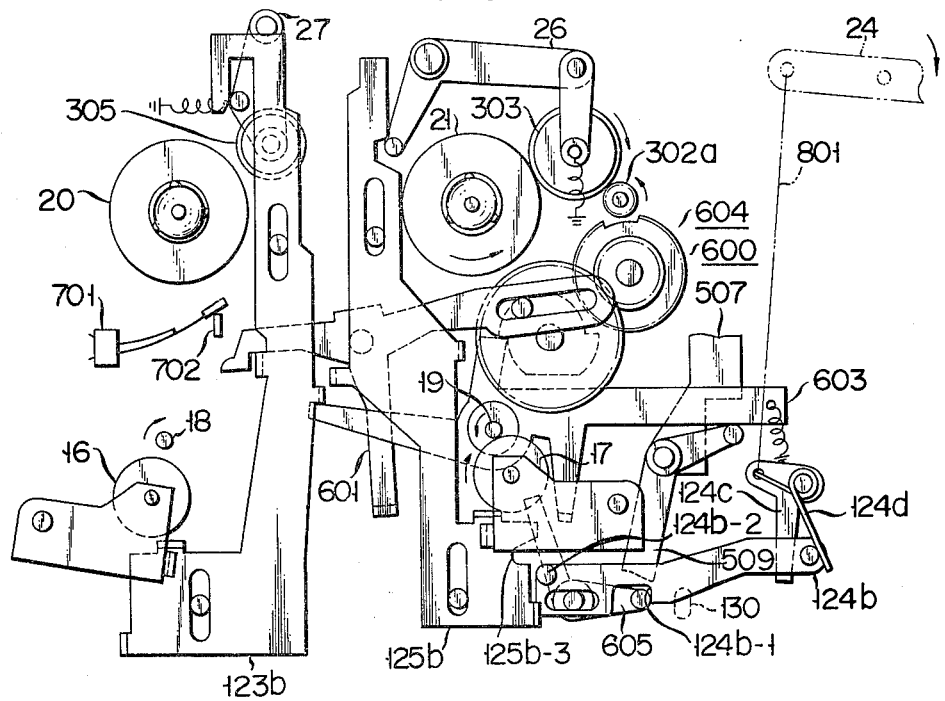

Now let us suppose a case of play-back operation in the rightward or forward direction, as shown in FIG. 4B (the forward-reverse switching mechanism 600 of the normal-speed tape feed system is so set as to give priority to the forward operation when the two control switches 123 and 125 are operated at the same time, for a reason mentioned later). In this state, a gear lock lever 603, which is continually given clockwise biasing force by a tension spring 602 (FIG. 4A) connected to one end thereof and pivotally supported at its substantially central portion coaxially with the capstan 19, has its other end released from the engagement with downward strips of the left and right reproducing sliders 123b and 125b by the penetration of the sliders 123b and 125b, in this case. Then, the gear lock lever 603 is rocked from the stop position of FIG. 4A in the direction of the biasing force to engage its top projection 603a with a cam portion 604a of a reverse gear mechanism 604 as mentioned later, thereby maintaining the reverse driving lever 601, which cooperates with the gear mechanism 604 in such manner as mentioned later, in a position as illustrated (hereinafter referred to as first position), and preventing penetration of the left reproducing slider by engaging a downward strip of the slider 123b. At this time, one end of the link mechanism 26 is caused by the urging force of a spring to fall in a recess 125b-1 formed in the upper lateral face of the right reproducing slider 125b which has been allowed to penetrate, so that the right take-up idler 303 pivotally mounted on the other end of the mechanism 26 rocks in the clockwise direction to come into contact with the small-diameter portion of the central pulley 302 and the right reel holder 21, thereby performing the rightward or forward play-back. (This applies also to a case of 1-reciprocation automatic reverse operation as mentioned later where the forward control lever 125a as shown in FIG. 5A is operated.)

When the tape end is reached in such forward play-back state, the detecting portion of the automatic shut-off mechanism 500 operates in the aforementioned manner. In this state, the gear lock lever 603 is rocked from the stop position of FIG. 4A in the clockwise direction, so that its one end 603b is pivotally mounted on the tip end of the releasing slider by pin-slot coupling, rocking a substantially L-shaped automatic shut-off select lever 509, which is usually subject to counterclockwise biasing force given by a spring 508 (FIG. 4A), in the clockwise direction round a pivotal point at the center thereof. Accordingly, the select lever 509 is shifted from a position where it usually faces a lock plate releasing portion 130 to a position where it faces one end of a substantailly L-shaped, pivoltally mounted reverse lever 605, thereby rocking the reverse lever 605 in the clockwise direction instead of performing the aforesaid automatic shut-off operation. As a result, the other end of the reverse lever 605 gets engaged with a downwardly projecting end 603c to rock the lever 603 counterclockwise, so that the upwardly projecting end 603a of the gear lock lever 603 is released from the engagement with the cam portion 604a of the reverse gear mechanism 604, shifting the reverse driving lever 610, which cooperates with the gear mechanism 604 in such a manner as mentioned below, to a position as shown in FIG. 4c (hereinafter referred to as second position).

Figure 6A:
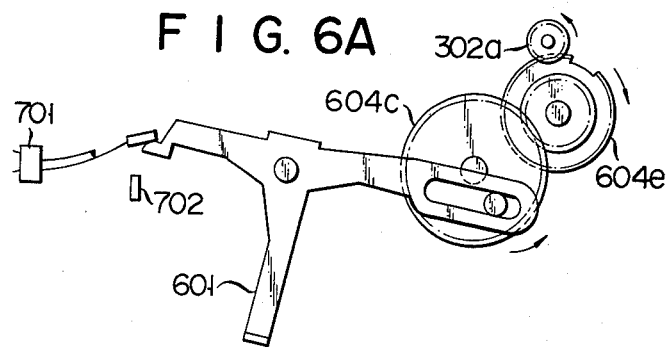
FIGS. 6A and 6B are plan views showing varied operating states of a normal-speed forward-reverse switching mechanism section of the tape recorder.
Figure 6B:
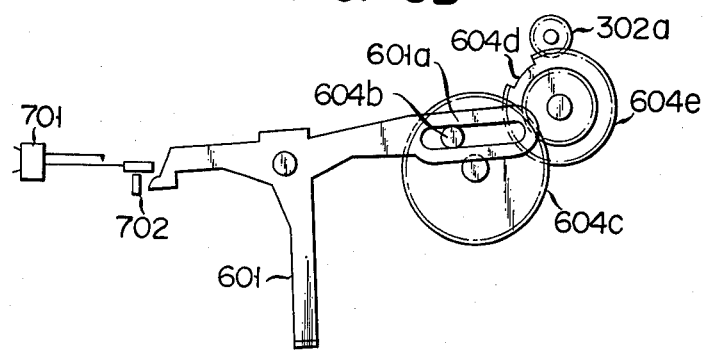

Now there wil be described the cooperative relation between the reverse driving lever 601 and the reverse gear mechanism 604. The reverse gear mechanism 604 is composed of a pin 604b engaging a slot 601a formed at the right end of the reverse driving lever 601, a reverse gear 604c having the cam portion 604a, and the reverse gear 604e coaxial and integral with a small gear engaging the gear 604c and having a notch 604d at a portion of its outer periphery. Usually (including a case where the reverse driving lever 601 is in the first or second position for play-back in a fixed direction), the notch 604d of the reverse gear 604e faces the central pulley gear 302a, the two gears 604e and 302a not engaging each other. When in such a state the tape end is reached to release the engagement of the gear lock lever 603 with the gear mechanism 604 as aforesaid, the reverse gear 604c is rocked a little in the counterclockwise direction by the clockwise turning force of the driving lever 601 given by the slider 123b. Consequently, the gear 604e finally rocks in the opposite or clockwise direction, accompanying the counterclockwise rocking of the gear 604c, so that the gear 604e gets engaged with the gear 302a. Then, the central pulley gear 302a, which rotates independently of the tape run to serve, in a way, as the driving source for the automatic reverse action as is the case with the automatic shut-off operation, has its rotation transmitted to the gear mechanism 604 to give a turn to the gear 604e, thereby shifting the reverse driving lever 601 from the position of FIG. 4D to the position of FIG. 4c. That is, the reverse driving lever 601 is shifted from the first position to the second position. Hereupon, when the gear ratio of the gear mechanism 604 is set at a suitable value, the notch 604d of the reverse gear 604e again comes to face the central pulley gear 302a at a point of time when the reverse driving lever 601 is shifted to the second position, thereby restoring the original state in which the gears 604e and 302a do not engage each other. FIGS. 6A and 6B show initial and last stages of rocking of the driving lever 601 toward the first position.

Figure 4C:
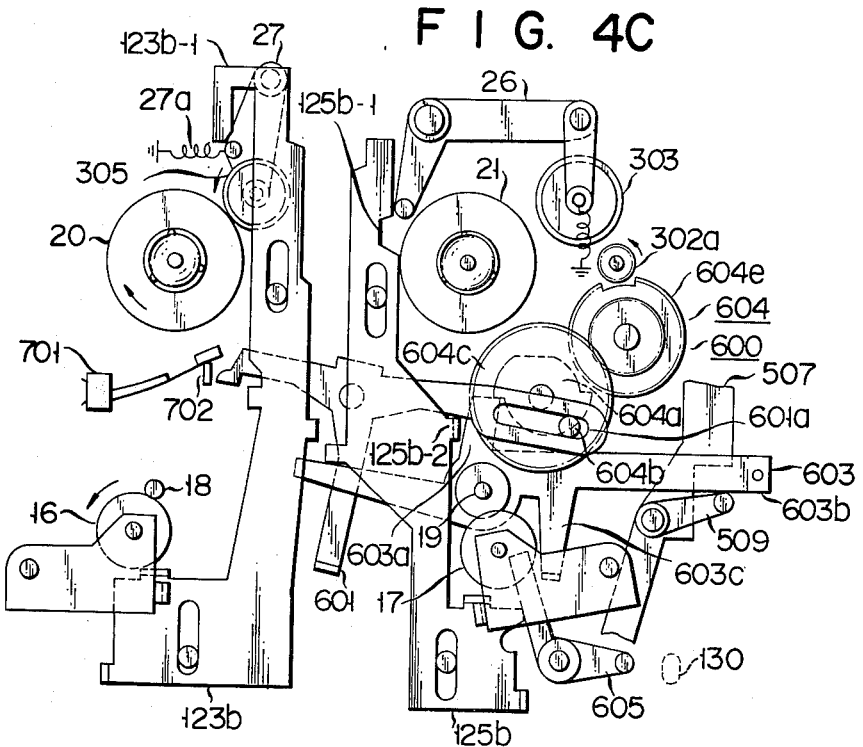

Thus, when the reverse driving lever 601 is shifted to the second position, the reproducing slider 123b, which has so far been arrested by the left end of the reverse driving lever 601 through its downward strip, is allowed to penetrate, providing the leftward or reverse play-back state as shown in FIG. 4C. In this case, accompanying the shift of the reverse driving lever 601 from the first position to the second position, the right reproducing slider 125b, which has so far been penetrating, has its downward engaging portion 125b-2 thrusted by one right end of the reverse driving lever 601 to be pushed back in the downward direction as illustrated to the stand-by position. Thereupon, the control member 27, which has so far been in a hooked end portion 123b-1 of the left reproducing slider 123b which is then allowed to advance, is released and turned clockwise round its pivotal point by a spring 27a. Accordingly, the left take-up pulley 305 attached to a free end of the control member 27 is brought in touch with the left reel holder 20, thereby enabling the aforesaid leftward or reverse play-back operation.

When the tape end is reached in such reverse play-back state, the detecting portion of the automatic shut-off mechanism 500 operates again, so that the play-back direction is switched from reverse to forward (FIG. 4B). Thereafter, the forward-reverse play-back operations will be repeated any number of times unless the tape recorder is stopped by operating the STOP control switch 121.

The above-mentioned automatic reverse operation of the so-called full-mechanical type may be achieved by means of the forward-reverse switching mechanism 600 of the normal-speed system including the reverse driving lever 601 for directly switching the play-back state between forward and reverse and the reverse gear mechanism 604 cooprating therewith. The turning force of the motor 23 as an essential switching driving force for the tape recorder is selectively transmitted through the central pulley gear 302a to operate the reverse driving lever 601, thereby bringing one reproducing slider 123b or 125b into the driving state and setting the other reproducing slider 125b or 123b at the standby to attain the first and second positions. It is to be understood that such full-mechanical automatic reverse system may be suited to cassette-type and other portable tape recorders, eliminating the defects to which prior art tape recorders employing an electromagnetic switching mechanism such as solenoid plunger are subject. Since the automatic reverse system is of, so to speak, a 2-PLAY-button type, it can perform the ordinary one-way playback in an optional direction.

Now there will be described a preference mechanism for giving preference to the rightward run when the PLAY (R) and (F) control switches are operated simultaneously. As already described, this preference operation may be achived by fixedly setting the off-state position of the reverse driving lever 601. Namely, it depends on the positional relation between the normal-speed forward-reverse switching mechanism 600 including the reverse driving lever 601 and the gear mechanism 604 coacting therewith and an assembly of a leaf power switch 701 and a switch slider 702, as shown in FIGS. 4A to 4C and 5A and 5B. The switch slider 702, driven engagedly with all the control switches except the STOP and PAUSE switches 121 and 127, tends to close the leaf power switch 701 to supply the motor 23 with power. Then, as stated before, the automatic reverse operation is achieved by allowing the penetration of one of the reproducing sliders 123b and 125b and checking the other. When the two PLAY control switches 123 and 125 are operated at the same time, the reverse driving lever 601, if in the first position as shown in FIG. 6B, will not engage the leaf power switch 701 to provide the rightward running state, since the upwardly projecting end 603a of the gear lock lever 603 engages the cam 604a of the reverse gear mechanism 604 before the left and right reproducing sliders 123b and 125b engage the reverse driving lever 601. On the other hand, if the reverse driving lever 601 is in the second position as shown in FIG. 6A when the tape recorder is stopped (i.e., stopped in the leftward running state), then the left end of the reverse driving lever 601 is engaged with an elastic contact of the leaf power switch 701. Accordingly, when the switch slider 702 is returned by restoring the control switch to leave the elastic contact of the leaf switch 701, the engaging end of the reverse driving lever 601 is pressed down by the elasticity of the elastic contact of the switch 701 to maintain the power on until the first position of FIG. 6B is restored. Thus, whenever the two PLAY control switches 123 and 125 are operated simultaneously, the rightward run is given preference.

Such preference mechanism enables reasonable operation without contradicting any prior conditions, since the tape is usually loaded for the rightward or forward run, and the two PLAY control switches 123 and 125 are usually operated simultaneously for the automatic reverse operation. Moreover, such preference mechanism, requiring not a single additional part, does not utilize the force of inertia of the flywheel or the like, so that preference operation may easily be secured without increasing the flywheel in size.

Although only the reproducing or play-back operation has been described in connection with the automatic reverse action, it is to be understood that reciprocative recording by automatic reverse may be achieved by operating the REC control switch 124 along with both the PLAY (R) and (F) control switches 123 and 125.

When executing such automatic reverse recording, it is rather unadvisable to repeat the operation, unlike the case of the automatic reverse play-back. That is, in the automatic reverse recording, the frequency of tape run should preferably be limited to one time for each direction-one-reciprocation recording.

Figure 5B:
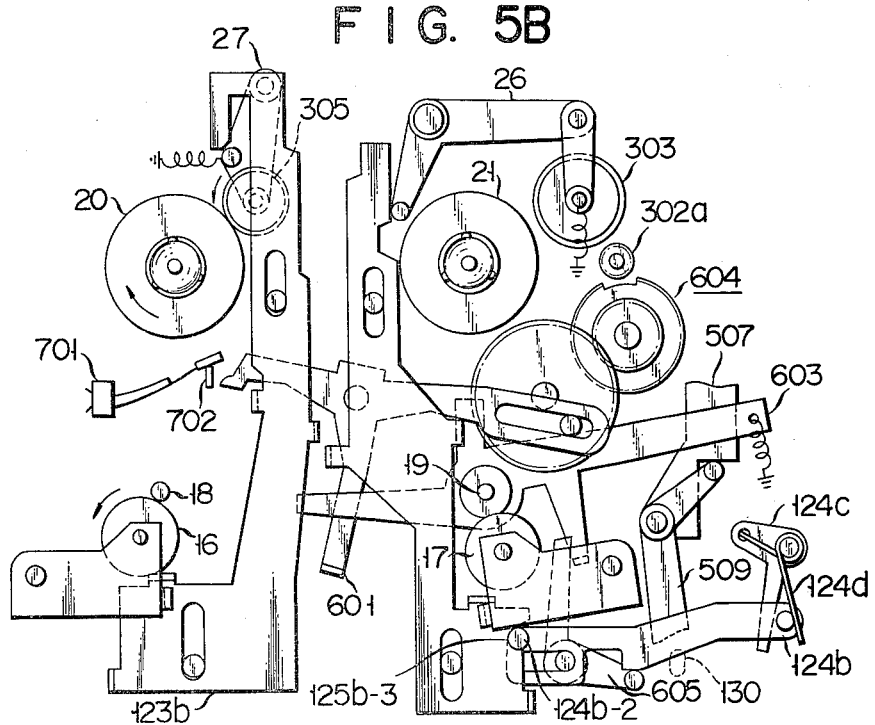

Such limitation of the frequency of reversal may be required not only in recording but in play-back operations; where only one-reciprocation play-back is desired or where automatic play-back is required only once more after repeated operations. Thus, there is needed a reverse frequency limiting mechanism for limiting the number of times of automatic reverse action by means of external operation as required. Accordingly, there will now be described the reverse frequency limiting mechanism provided for such purpose. By rocking the control lever 24 as shown in FIG. 4A in the clockwise direction round its pivotal point, a substantially L-shaped limit lever 124c, which is capable of rocking round its pivotal point, is rocked in the same direction through a wiry rod 801. Then, as shown in FIG. 5A, a limit slider 124b is released from positional restriction to which it has so far been subject because of its pin's hitting against one end of the limit lever 124c, and is given a biasing force by a spring 124d which thrusts the pin to the left as illustrated. In this state, a notch 124b-1 is engaged with a pin protruding from one end of the reverse lever 605, so that the limit slider 124b is restricted in position while it is subject to the leftward biasing force. Thus, when the automatic shut-off mechanism 500 operates to rock the reverse lever 605 in the clockwise direction, the right slider 125b is finally withdrawn to the stand-by position, while the left slider 123b is allowed to advance, thereby switching the mechanism to play-back or recording state in the leftward or reverse direcion as shown in FIG. 5B. In the retreating process of the right reproducing slider 125b, a basic end pin portion 124b-2 of the limit slider 124b, which is given a leftward biasing force to be able to slide horizontally as illustrated, falls in a recess 125b-3 formed on the forward side face of the slider 125b, thereby preventing the right reproducing slider 125b from entering again. Further, the clockwise rocking of the reverse lever 605 is maintained to rock the gear lock lever 603 counterclockwise by its other end portion. By turning the automatic shut-off lever 509 to a position where it faces the lock releasing portion 130, the automatic shut-off mechanism 500 performs its automatic shut-off operation at the time when the tape end is reached in the reverse play-back or recording. Thus, the play-back or recording operation is sure to be performed for only one reciprocation.

Accordingly, double or further wrong recording (mistaken erasure) may be prevented, and, also in play-back operation, the frequency of reverse can be limited. Since the reverse frequency limiting mechanism for this purpose can be obtained by only adding a simple mechanism to the full-mechanical automatic reverse system, it may suitably be used as an attachment to the automatic reverse system. That is, the reverse frequency may be limited both in recording and in play-back only when the control lever 24 of the reverse frequency limiting mechanism is operated. In other words, automatic reverse operation can be continued endlessly even in recording unless the lever 24 is operated, which may effectively be applied to a case where only up-to-data information is to be recorded, so that time-limited and endless automatic reverse operations may be used properly according to various applications. Moreover, this reverse frequency limiting mechanism can achieve its function even when the manual reverse control lever 25 is operated, that is, in the middle of manual reverse operation. In any case, the tape recorder would be stopped finally in the same pattern of process, such as rightward →leftward →stop or leftward →rightward →leftward →stop (when the reverse PLAY (R) control switch 123 is operated with priority), so that the current functional condition can easily be identified.

Figure 8A:
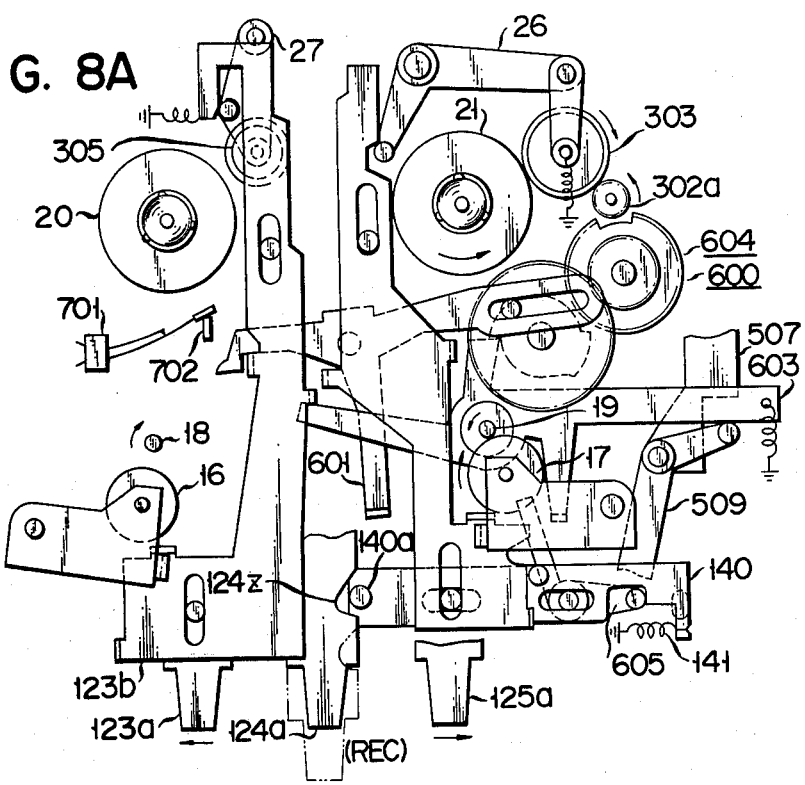
FIGS. 8A and 8B are plan views showing an automatic reverse frequency limiting mechanism section of the tape recorder in two different states.
Figure 8B:
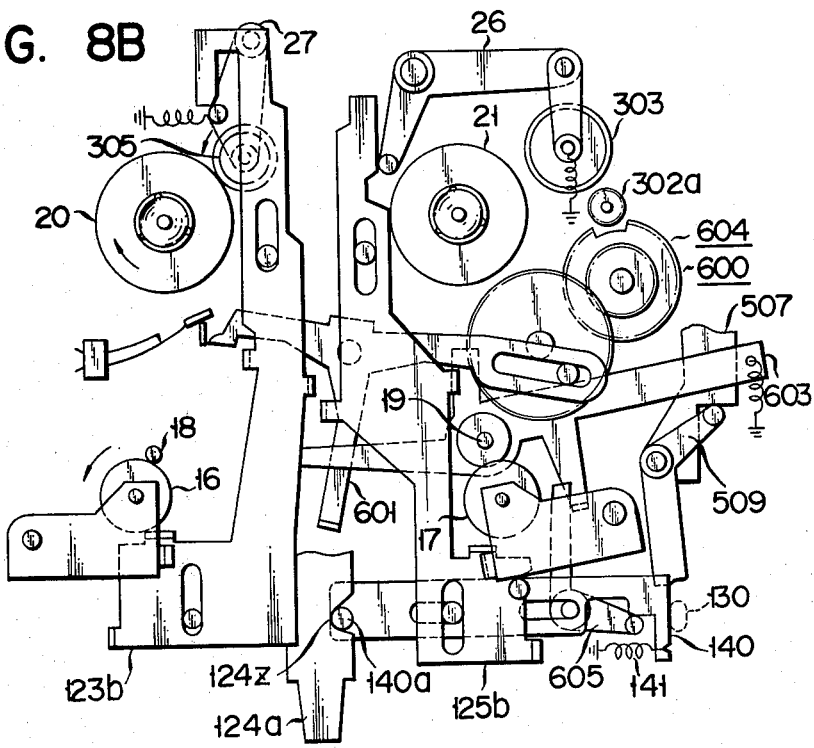

However, if REC control switch 124 is operated simultaneously with both the PLAY (R) and (F) control switches 123 and 125, that is, in automatic reverse recording, it may be advisable to prevent wrong recording or erasing by limiting the reverse frequency so as automatically to start one-reciprocation recording without externally operating the control lever 24 of the reverse frequency limiting mechanism. Then, there will be described a mechanism automatically turning to one-reciprocation recording when the REC control switch 124 is operated together with both the PLAY (R) and (F) control switches 123 and 125 for automatic reverse recording (where priority is given to rightward tape run). As shown in FIG. 8A, a limit slider 140 is horizontally slidably arranged so as to function as a stopper against the reverse lever 605 which operates when the tape end is detected, the right reproducing slider 125b which advances and retreats at time of rightward and leftward runs respectively, and the control lever 124a of the REC control switch 124, the limit slider 140 being given a leftward biasing force by a spring 141. In this case, the stopper function as against the former two members is the same as the case with the limit slider 124b of FIG. 4A. As against the control lever 124a of the REC control switch 124, however, such function is achieved with an end pin 140a of the limit slider 140 falling into a recess 124Z formed in the side face of the lever 124a. Namely, the limit slider 140, which cannot slide to the left as illustrated in the rightward recording, restricted by the reverse lever 605, is released from such restriction in the aforesaid manner to be allowed to slide leftward when the tape end is detected at the end of the rightward recording, thereby causing the end pin 140a of the slider 140 into the recess 124Z of the control lever 124a of the REC control switch 124. Thus, the clockwise rocking of the reverse lever 605 is maintained as described before, and the recording operation may be limited to one-reciprocation by executing the automatic shut-off action when the tape end is reached at the end of the leftward tape run, as shown in FIG. 8B. In this case, the reverse lever 605 operates in the same way as aforesaid to shift the tape run from rightward to leftward, effecting automatic shut-off operation when the tape end is detected in the leftward running process. Thus, by such automatic reverse frequency limiting mechanism for automatic reverse recording, wrong recording may securely be avoided with ease.

Now there will be described a manual reverse control mechanism, which tends to reverse the direction of tape run at an optional point of time without waiting for the tape end to be reached to operate the detecting portion of the automatic shut-off mechanism 500, when the tape recorder is set to automatic reverse and the tape is running in a direction. This mechanism provides various facilities for the actual use of the automatic reverse system. For example, when reproducing music from one track of a tape by automatic reverse, you might want to reproduce a piece of music on the other track without hearing the following piece or pieces on the same track. Further, in the middle of automatic reverse recording, the tape end or leader and timing tape may be reached substantially to prevent recording until the leader and timing tape is followed by the other track. Such awkward situation can, however, be avoided by previously switching the mechanism to the other track. The manual reverse control mechanism is expected only to cause the normal-speed forward-reverse switching mechanism 600 to operate at an optional point of time to the same effect produced by the action of the detecting portion of the automatic shut-off mechanism 500. Therefore, it is required only that the gear lock lever 603 as shown in FIG. 4A be released from the engagement with the cam portion 604a of the reverse gear mechanism 604 by pulling the control lever 25 in the direction of the arrow to rock the gear lock lever 603 in the counterclockwise direction, with a wiry rod 802 connected to the control lever 25 being coupled to one end of the gear lock lever 603. Thus, the direction of tape run may securely be reversed with ease at an optional point of time.

Figure 7A:
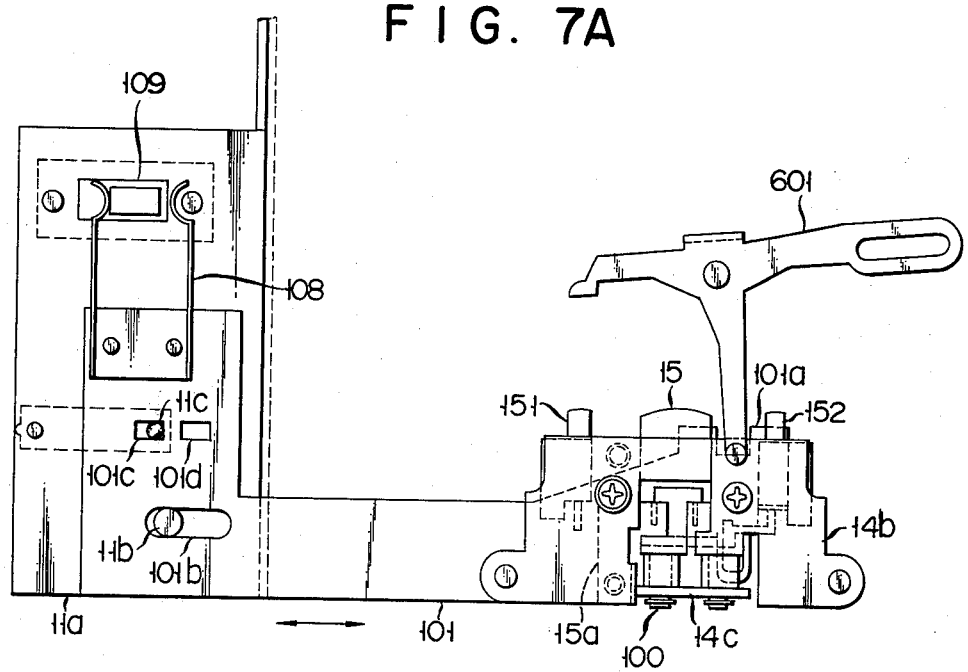
Figure 7E:
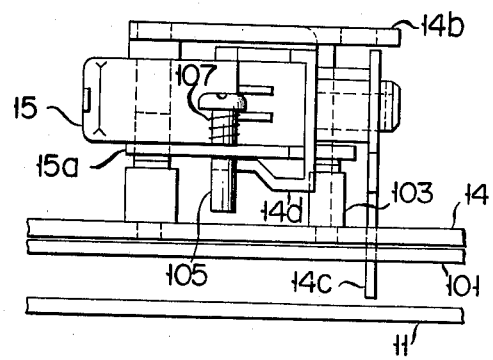
Figure 7F:
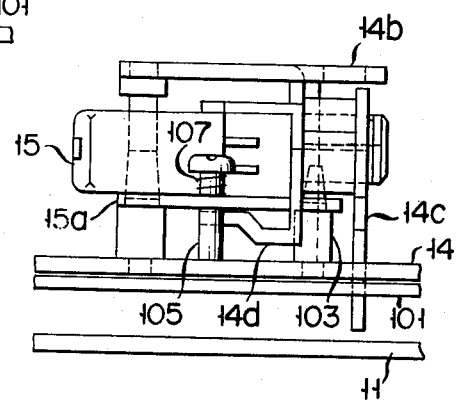
Figure 7G:
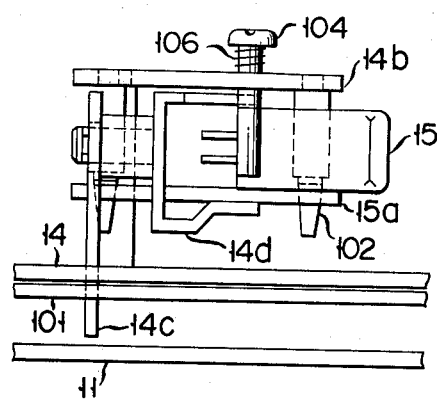
Figure 7H:
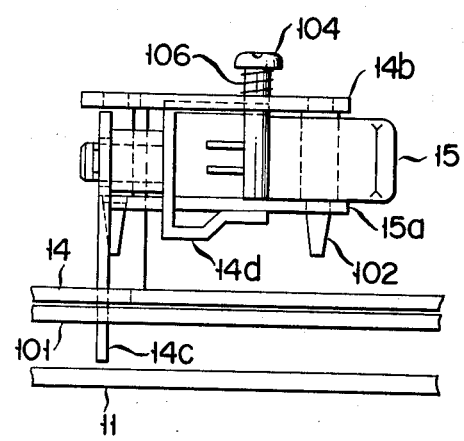

Now there will be described a head control mechanism 100. As shown in FIGS. 7A and 7B, there is provided a head switching slider 101 which can slide in the horizontal direction as illustrated so as to take a right-hand or left-hand position corresponding to the first or second position of the reverse driving lever 601, with a recess 101a formed at its tip end engaging the bottom end of the reverse driving lever 601 of the normal-speed forward-reverse switching mechanism 600. Here, the head switching slider 101 has no direct connection with the head slider 14, a guide pin 11b on a sub-chassis 11a and a click ball 11c engaging a slot 101b and a square hole 101c or 101d respectively. As shown in FIG. 7B, a head mount plate 14b having erasure heads 151 and 152 at each end is fixed in parallel to the head slider 14 by means of a proper number of supports 14a. in front of the mount plate 14b, there is an L-shaped head switching lever 14c pivotally mounted at right angles to the plate 14b. One end of the lever 14c is engagedly attached between two wiry engaging members 101e protruding from and supported by the forward end of the head switching slider 101, thereby converting a horizontal slide of the head switching slider 101 into a vertical shift of the recording reproducing head 15 through a head holding member 14d with a substantially U-shaped side face which is loosely fitted with the other end or backwardly extending portion of the head switching lever 14c. These members are independent of the horizontal sliding system including the head slider 14. The head holding member 14d holds at its one end the recording reproducing head 15 together with a head base 15a supporting the head 15. In this case, as shown in FIGS. 7C and 7D, two pairs of upper and lower receiving pins 102 and 103 extending respectively from the head mount plate 14b and head slider 14 and a pair of upper and lower azimuth adjusting screws 104 and 105 engage the head base 15a. As a result, a vertical shift position is located, and upper and lower azimuths are set for optimum results. The upper and lower receiving pins 102 and 103 each have a tapered tip end and a stepped portion between the tip end and the basic portions, engaging an engaging hole 15b or 15c of the head base 15a to move the head base 15a properly in the vertical direction and to locate the vertical position. The upper and lower azimuth adjusting screws 104 and 105 tend independently to adjust by means of springs 106 and 107 the upper and lower azimuths of the recording reproducing head 15 to their respective optimum states, through the located head base 15a. FIGS. 7C and 7D show cases where the recording reproducing head 15 is shifted upward and downward to feed the tape leftward and rightward with the reverse driving lever 601 in the first and second positions, respectively. Further, FIGS. 7E and 7F show, respectively, midway and stop positions during and after rightward tape feed in which the recording reproducing head 15 is moved downward, while FIGS. 7G and 7H show, respectively, the midway and stop positions during and after leftward tape feed in which the head 15 is moved upward.

The sub-chassis 11a is provided with a head selector switch 109 for switching the head 15 correspondingly to L- and R-channels for stereotapes, if the head 15 is a stereo head, by means of a switch spring on the head switching slider 101, accompanying a vertical shift of the head 15, and for switching erasure heads 151 and 152. In a mono-aural application, however, the former function is unnecessary.

According to the aforementioned head shift mechanism, the azimuths may independently be adjusted in advance correspondingly to the time lag in reciprocative tape run, requiring no special or extraordinarily expensive recording reproducing head. In a conventional-type head shift mechanism, the azimuth adjustment is made by using a solenoid plunger, which cannot eliminate the unsteadiness of head on either side. That is, despite the 3-point adjusting system, such mechanism is subject to flapping or unsteadiness because of its involving only coplanar engagement. With the construction of this invention, however, the head base 15a is 3-point-supported by means of two taper pins and one azimuth adjusting screw on each side, so that it is stable without suffering flapping. Moreover, since the taper pin is fitted in the engaging hole of the head base for positional restriction, the unsteadiness on both right and left sides can be eliminated.

Figure 9A:
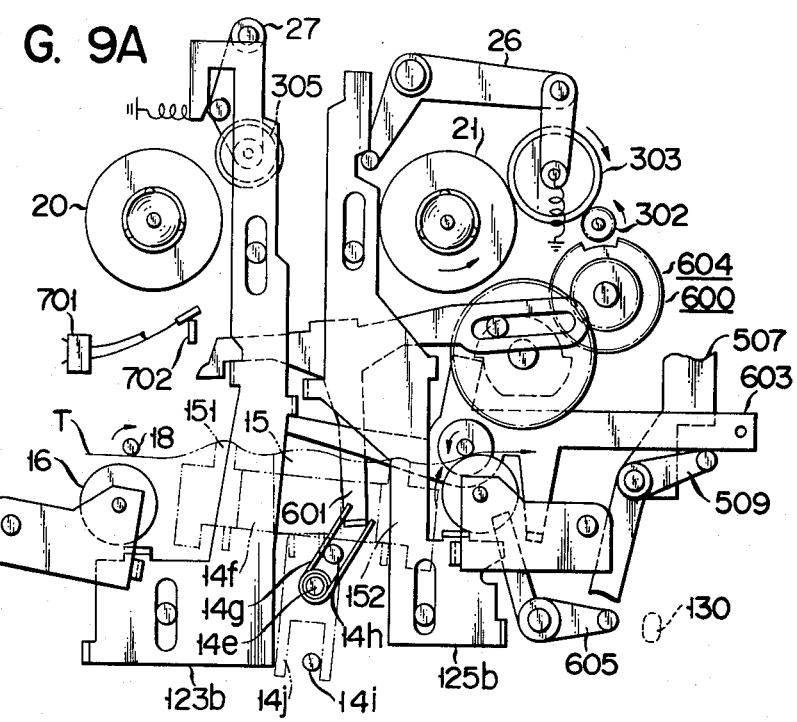
FIGS. 9A and 9B are plan views showing a modification of the head shift mechanism in two different states.
Figure 9B:
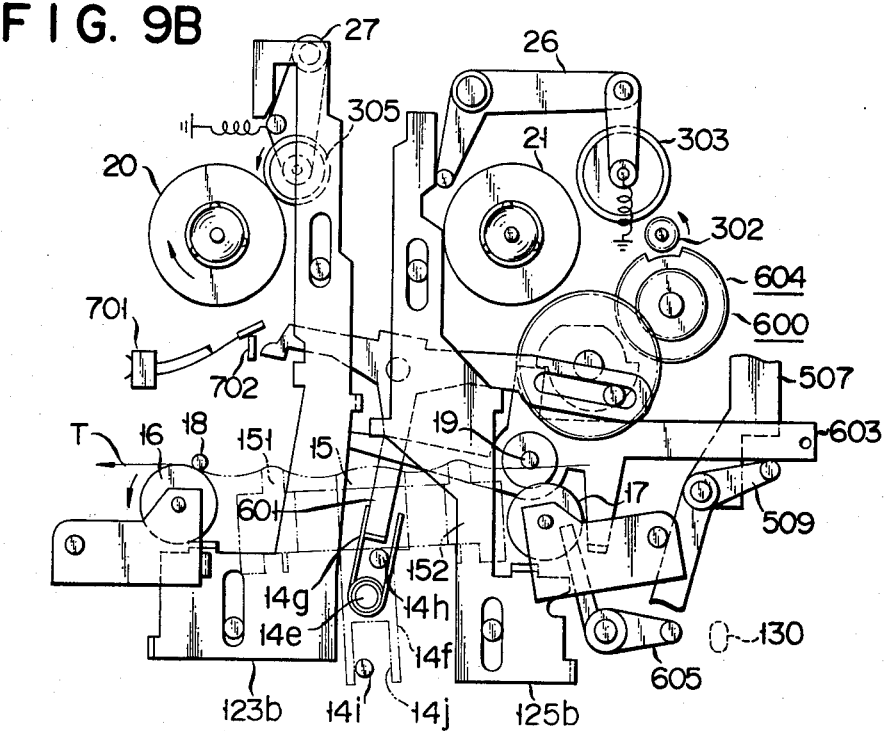

In the head control mechanism 100, the pair of erasure heads 151 and 152 themselves are fixed (in this case each head face corresponds to the upper or lower position). Actually, however, it is to be desired that an antinomic requirement be satisfied; the plunge of the erasure head into the tape surface must be increased and decreased in order to improve the erasure rate in the automatic reverse operation (recording) and the wow characteristic, respectively. Accordingly, there will now be described an erasure head plunge control mechanism to meet such requirement. As indicated by chain lines in FIGS. 9A and 9B, there is provided a substantially T-shaped erasure head base 14f capable of swinging round a pin 14e between the head slider and head mount plate. The erasure heads 151 and 152 are mounted on both ends of the top of the erasure head base 14f, respectively. A spring 14g, having its central portion engaged with the pin 14e and two ends extending substantially in parallel with each other, engages at its extending portion the bottom end of the reverse driving lever 601. Thus, the erasure head base 14f is turned clockwise (FIG. 9A) or counterclockwise (FIG. 9B) correspondingly to the first and second positions of the reverse driving lever 601, without regard to the head slider and head mount plate. Therefore, the plunge of the erasure heads 151 and 152 is smaller on the lower-course side than on the upper-course side as viewed from the recording reproducing head 15. That is, the erasure rate may be improved by setting the plunge of the left erasure head 151 larger than that of the right erasure head 152 by a predetermined amount, and the wow characteristic may be improved by reducing the load on the lower-course side which may be an essential cause of wows, at time of rightward feeding. Similar but contrary effects may be obtained for the case of leftward feeding. Numeral 14h of FIGS. 9A and 9B designates a stopper engaging the spring 14g to restrict the swing of the erasure head base 141, while 14i denotes an engaging member that engages a recess 14j at the bottom end of the erasure head base 14f to slide the head switching slider 101 in the horizontal direction. If the erasure head base 14f is designed with a wide swing so as to allow the no-use erasure head to retreat over a substantial distance, it will be possible to use a magnetic erasure head which may be lower than an AC-type erasure head in price.

Figure 10A:
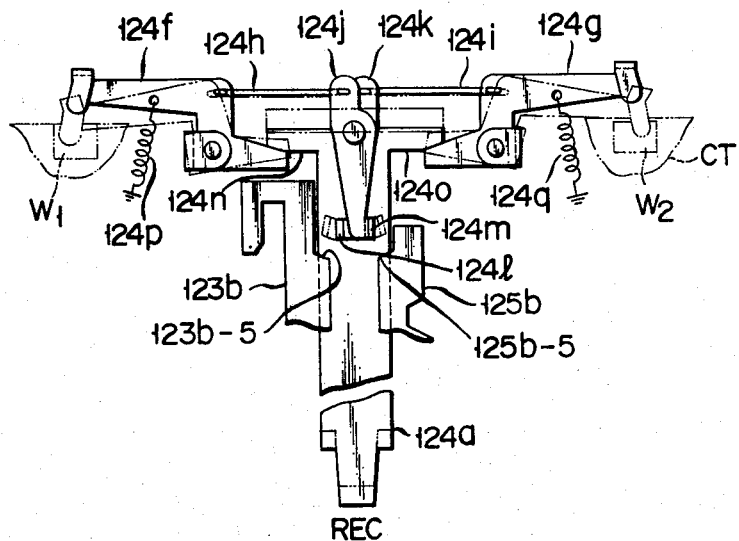
FIG. 10A is a plan view showing a wrong erasure preventive mechanism of the tape recorder.
Figure 10B:
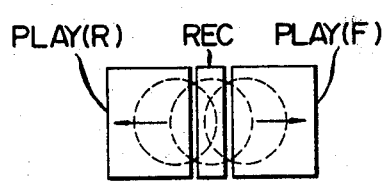
FIGS. 10B to 10E are plan views showing reverse play-back, recording and forward play-back buttons in various shapes and arrangements.
Figure 10C:
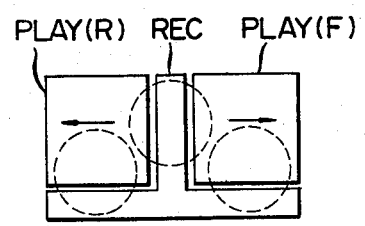
Figure 10D:
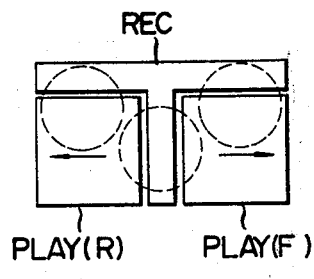
Figure 10E:
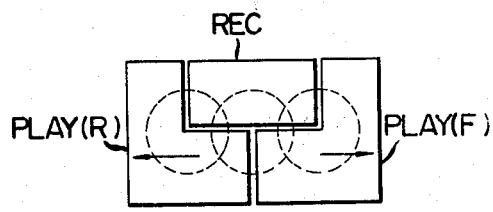

Now there will be described a wrong erasure preventive mechanism. FIG. 10A shows the wrong erasure preventive mechanism extracted from FIG. 1. Formed on the control lever 124a of the REC control switch 124 are stopper portions 124n and 124o projecting to the left and right at its backward end portion. Swingably provided are substantially crank-shaped left- and right-claw detection levers 124f and 124g each having one end engaged with each of the stopper portions 124n and 124o, counterclockwise and clockwise biasing forces being applied to the detection levers 124f and 124g by springs 124p and 124q, respectively. These detection levers 124f and 124g are coupled to alternately rockably supported left and right recording prevention levers 124j and 124k by means of wiry rods 124h and 124i, respectively. Also, there are provided stopping members 124l and 124m capable of swinging to the left and right so as to hold the other ends of the recording prevention levers 124j and 124k. Here the stopping members 124l and 124m correspond to stopper portions 123b-5 and 125b-5 on the left and right reproducing sliders 123b and 125b respectively. W1 and W2 designate a pair of detection windows formed at rear portions of the case of a cassette tape (CT). When the REC control switch is operated to thrust its lever 12a into a position as indicated by the chain lines, the left- and right-claw detection levers 124f and 124g, which have so far been engaged with the stopper portions 124n and 124o of the lever 124a and positionally restricted, are allowed to swing in the directions of the respective biasing forces to which they are subject. The respective one ends of the detection levers 124f and 124g are induced to penetrate their corresponding detection windows W1 and W2 of the cassette tape. If the detection windows W1 and W2 are closed with the so-called wrong erasure prevention claws, these ends are prohibited from penetration. If such claws are cut off, however, the ends are allowed to penetrate the windows, so that the swing range is extended. Then, the left or right prevention lever 124j or 124k to which the extended swing is transmitted by means of the rod 124h or 124i is rocked, so that the stopping member 124l or 124m is moved from a position indicated by full lines to a position indicated by broken lines. Accordingly, the left or right reproducing slider 123b or 125b has its stopper portion 123b-5 or 125b-5 hit against the shifted stopping member 124*l* or 124*m*. One or both of the sliders 123*b* and 125*b* are prevented from penetration (no claws) or allowed to penetrate (claws entire). In any case, recording or wrong erasure may be avoided on a side or sides with no wrong erasure prevention claw.

Unlike the convention ones, the REC control switch of the tape recorder of this invention can be operated at any time irrespectively of the existence of the wrong erasure prevention claws, and a PLAY control switch or switches on a side or sides without the claws cannot be operated. Accordingly, recording may be achieved on a cassette tape with a single claw by reversely feeding the tape without invertedly loading it. Further, the PLAY (R) and (F) control switches 123 and 125 are arranged on each side of the REC control switch 124, so that the correspondence with the cassette tape can easily be understood to facilitate operation, and the wrong erasure preventive mechanism may be formed in a symmetrical shape, which is advantageous in both design and manufacture (especially in die molding, etc.).

Moreover, in the above-mentioned wrong erasure preventive mechanism, the detection lever is withdrawn when the tape recorder is stopped, so that the cassette tape may easily be loaded and unloaded. This holds also in a case where the ordinary wrong erasure prevention is to be made by employing half of the aforesaid mechanism. Also in this case, a high degree of freedom in design is secured, affording special facility for upright-type tape recorders.

Figure 11A:
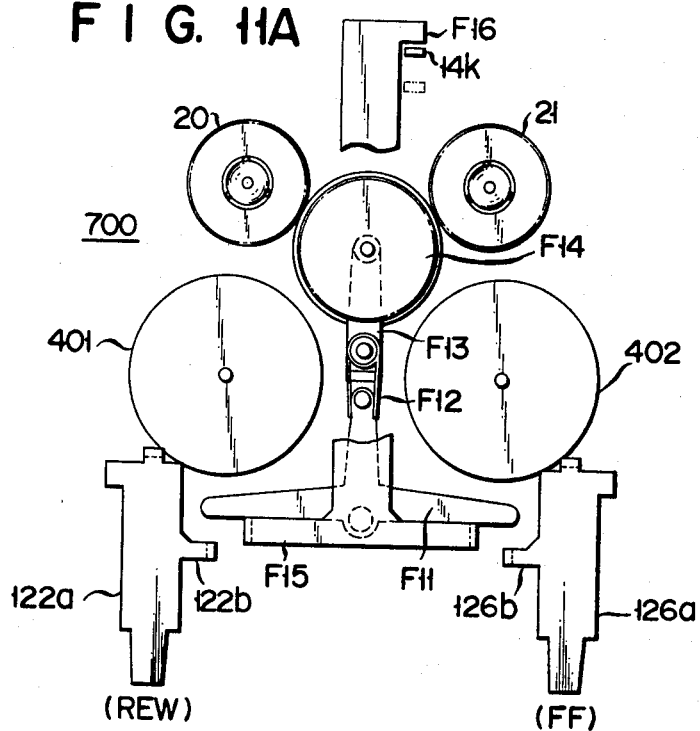
FIGS. 11A and 11B are plan views showing a high-speed forward-reverse switching mechanism section of the tape recorder in two different states.
Figure 11B:
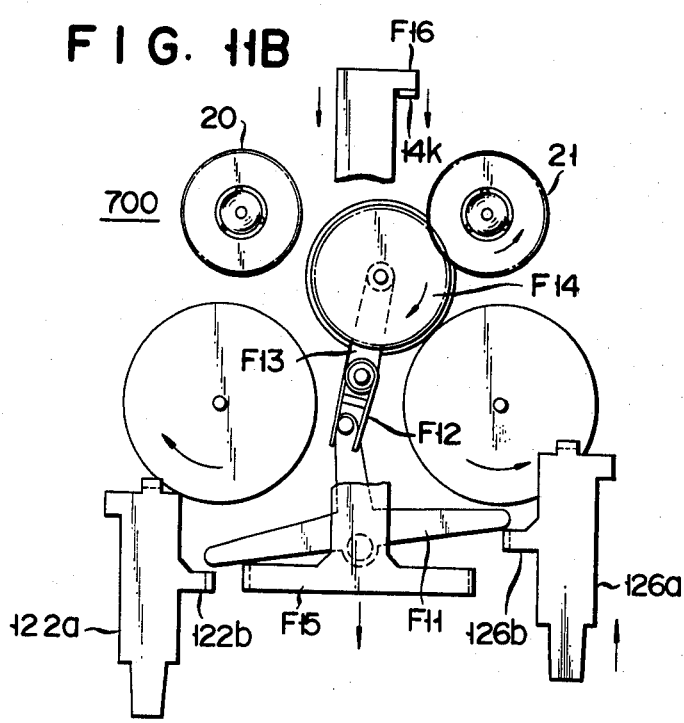

Now there will be described the forward-reverse switching mechanism 700 of the high-speed tape feed system. FIG. 11A shows the high-speed forward-reverse switching mechanism portion extracted from FIGS. 1 and 2. The respective control levers 122*a* and 126*a* of the REW control switch and FF control switch have engaging portions 122*b* and 126*b* protruding from the inside thereof, respectively. Between these levers 122*a* and 126*a* is a substantially inverted-T-shaped switch lever F11 supported swingably and having each end capable of engaging the engaging portions 122*b* and 126*b*. A pin protruding from the top end of the switch lever F11 is interposed between two leg portions of a spring mechanism F12, and engages one end of an idler supporting lever F13 supporting the middle portion of the spring mechanism F12. The other end of the idler supporting lever F13 is fitted with a high-speed idler F14 located between the pair of flywheels 401 and 402 as well as between the reel holders 20 and 21, and capable of selectively engaging one flywheel 401 with one reel holder 20 and the other flywheel 402 with the other reel holder 21. When the lever 126*a* of the FF control switch is thrusted as indicated by an arrow in FIG. 11B, for example, the engaging portion 126*b* engages its corresponding end of the switch lever F11 to swing the lever F11 counter-clockwise round its pivotal point. Then, the idler supporting lever F13 is rocked clockwise round its pivotal point by means of the spring mechanism F12, so that the high-speed idler F14 is brought into contact with both the right flywheel 402 and the right reel holder 21, thereby effecting high-speed feeding or fast forwarding in the rightward direction. In this case, the forward PLAY (F) control switch is previously operated, so that if the FF control switch is operated during play-back operation in the same direction, the switch lever F11 will swing counterclockwise to have its other end engage a high-speed slider F15, thereby pushing back the slider F15 in the direction of an arrow in FIG. 11B. As a result, a tip end engaging portion F16 of the high-speed slider F15 will pushed backed a little toward you or downward as shown in FIG. 11B an engaging portion 14*k* of the head slider 14 which has previously been thrusted from a position (stop position) as indicated by a broken line in FIG. 11A to a position as indicated by a full line in FIG. 11B, thereby allowing the so-called cue operation. If the control lever 122*a* of the REW control switch is operated independently or in combination with the reverse PLAY (R) control switch, rewinding or review state may be obtained by performing operation opposite to the aforementioned processes.

In such forward-reverse switching mechanism of the high-speed tape feed system, the mechanisms including the control switches are bisymmetric, and one and the same high-speed idler is used for both fast feeding and rewinding, thereby minimizing the number of positions that require control. Whereas in prior art tape recorders of this type two exclusive-use switch levers are respectively used for cue and review operations, this invention requires only a single switch lever, as already mentioned. Moreover, the use of the single switch lever prevents such wrong operation as to operate the REW control switch at the same time, so that the tape as well as the mechanism may be protected.

Now there will be described the features and advantages of the control mechanism portion capable of the aforementioned automatic reverse function. As already described in connection with FIG. 1 and other drawings, the PLAY (R) and (F) control switches 123 and 125 are arranged on both sides of the REC control switch 124 respectively, and the REW and FF control switches are disposed on each outer side of the PLAY control switches 123 and 125. Thus, the high-speed forward-reverse switching mechanism and the wrong erasure preventive mechanism may be formed bisymmetric, providing facilities for operation as well as for design and manufacture.

FIGS. 10B to 10E show various arrangements of the REC control switch and the left and right PLAY (R) and (F) control switches. Here the REC control switch is narrowed, T-shaped (or inverted-T-shaped), or extends over both the PLAY control switches. In this manner, an operation may be achieved by giving a single push to one of circled portions as indicated by broken lines over all the three or two adjacent control switches, according to the objects. Thus, recording or play-back by automatic reverse or in a desired direction may further be facilitated.

Figure 12A:
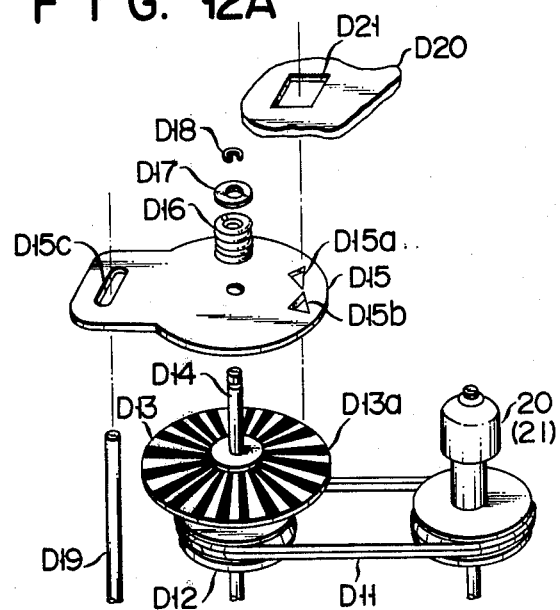
FIG. 12A is a perspective view of a disassembled tape run indicating mechanism section of the tape recorder.
Figure 12B:
FIGS. 12B to 12E show various indication patterns provided by the indicating mechanism section of FIG. 12A.
Figure 12C:
Figure 12D:
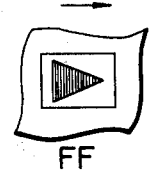
Figure 12E:
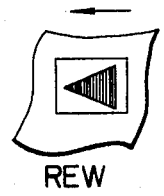

Referring now to FIGS. 12A to 12F, there will be described a tape run indicating mechanism specially suited for a tape recorder with the above-mentioned automatic reverse system. As shown in FIG. 12A, a pulley D12 is coupled to the left or right reel holder 20 or 21 by means of a belt D11. The pulley D12, which is formed integrally with an indicator board D13 having a striped top portion D13*a*, is rotatably mounted on a central shaft D14. The tip end portion of the shaft D14 protruding from the indicator board D13 engages a substantially gourd-shaped friction plate D15. The larger-circle portion of the friction plate D15 has two triangular apertures D15*a* and D15*b* with their apexes facing each other in the vicinity of the periphery of the circle, while the smaller-circle portion has a slot D15*c* formed in the vicinity thereof. The friction plate D15 is mounted on the shaft D14 at the center of the larger-circle portion by means of a torque adjusting compression spring D16 for braking, a lock washer D17 and a retaining ring D18. In this state, the slot D15c of the smaller-circle portion is engaged with a stopper D19. An indicator window D21 is formed in a portion of a tape recorder casing D20 corresponding to the middle portion between the triangular apertures D15a and D15b in the friction plate D15. In such construction, when either the left or right reel holder 20 or 21 rotates in a direction, the indicator board D13 is rotated by the turning force of the holder transmitted thereto. Then, the friction plate D15 also intends to rotate but slips, restricted by the stopper D19 engaging the slot D15c at one end thereof. Such slipping position is to be so set that either the triangular aperture D15a or D15b in the larger-circle portion may face the indicator window D21 of the tape recorder casing D20. Thereupon, the state of rotation of the striped portion D13a of the indicator board D13 can be observed through the indicator window D21 and one of the triangular apertures D15a and D15b of the friction plate D15 in accordance with the rotating direction (tape feed direction) and speed (normal or high) of the reel holder 20 or 21, as shown in FIGS. 12B to 12E. Namely, FIGS. 12B and 12C show, respectively, rightward and leftward play-back states in which the spaces between the stripes on the striped portion D13a look relatively wide, that is, the striped portion D13a moves slowly. On the other hand, FIGS. 12D and 12E show, respectively, fast-forwarding (FF) and rewinding states in which the spaces between the stripes look narrower, that is, the striped portion D13b moves swiftly. In this case, the direction of the apex of the triangular aperture D15a or D15b of the friction board D15 seen through the indicator window D21 designates the tape feed direction, so that the tape feed direction and speed may easily be identified from the state of the striped portion D13a. Moreover, changes of the rotating speed of the reel holder 20 or 21 accompanying feed roll decreases may be followed by the striped portion D13a, which may be a yeardstick of the remaining amount of tape. Naturally, neither of the triangular apertures D15a and D15b can be seen through the indicator window D21 while the tape recorder is stopped or at PAUSE, so that such states can also be realized.

Figure 12F:
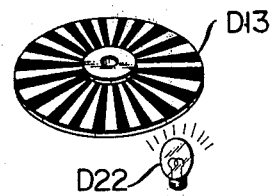
FIG. 12F is a perspective view showing a modification of an indicating member of the tape run indicating mechanism section as shown in FIG. 12A.

Additionally effective indication may be achieved by lighting up the indicator board D13 by means of a lamp D22 or the like, as shown in FIG. 12F. Further, by using one of the reel holders 20 and 21 which is not coupled to the tape counter, back-tension may be applied substantially equally to the reel holders 20 and 21, thereby further stabilizing the tape run in both directions.

Thus, according to this invention as described above, there may be provided a tape stop detecting mechanism capable of easily and satisfactorily detecting a stop of tape run, and expressly suited for a full-mechanical automatic reverse system of a portable tape recorder.

Figure 13:
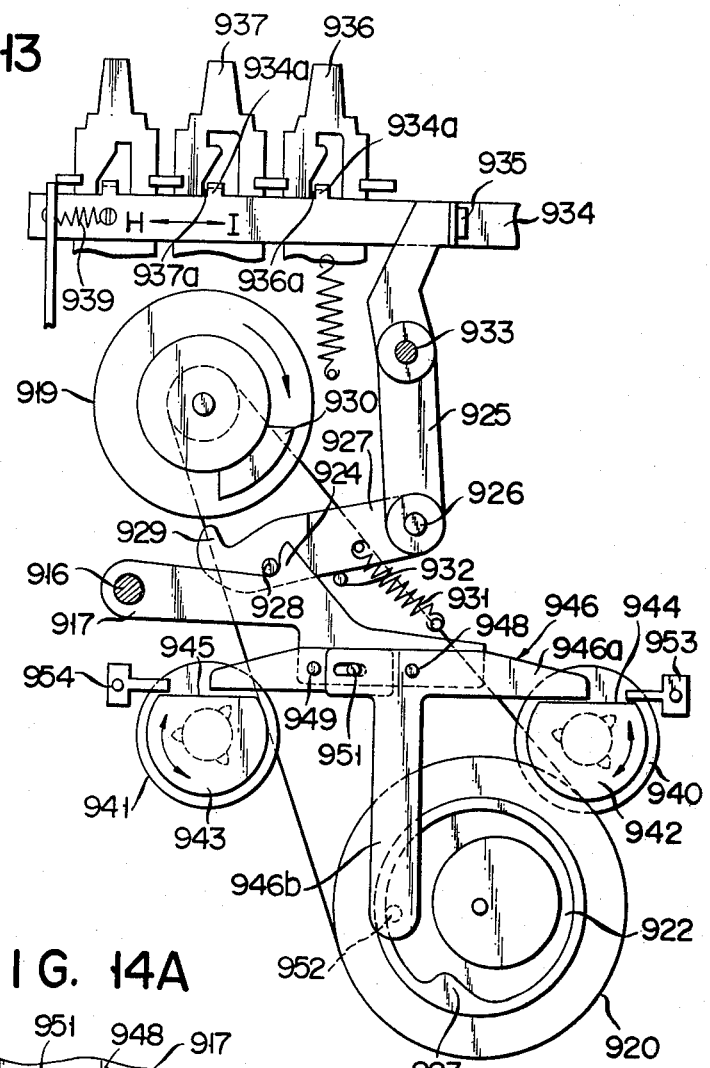
FIG. 13 is a plan view showing a modified example of tape end detecting system.
Figure 14A:
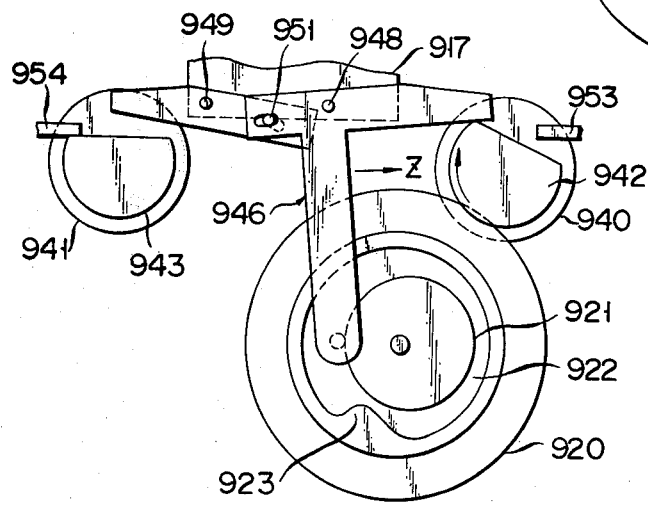
FIGS. 14A to 14C are plan views of the tape end detecting system in varied states for illustrating the operation thereof.
Figure 14B:
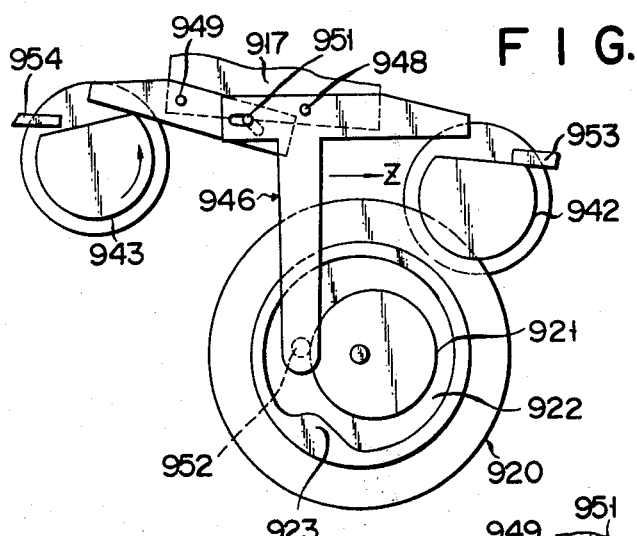
Figure 14C:
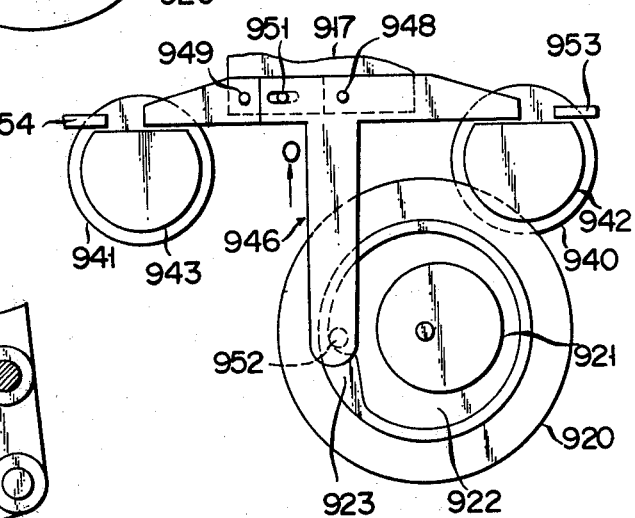

Referring now to FIGS. 13 and 14C, there will be described a modification of the tape end detecting mechanism.

In FIG. 13, right and left reel holders 940 and 941 are disposed at a distance from each other and supported rotatably; thr former is on the take-up side and the latter is on the supply side as regards the case of forward tape run. These reel holders 940 and 941 exchange their functions when the direction of tape run is reversed. Like the reel holders 20 and 21 of the aforementioned embodiment, by means of a friction member formed of a spring and others, the reel holders 940 and 941 are coaxially fitted on their respective top faces with rocking members 942 and 943 having rectilinear notches 944 and 945 across part of their peripheries, respectively. Between these rocking members 942 and 943 are main and auxiliary detecting members 946 and 947. The main detecting member 946 is substantially T-shaped, and the end of a rightwardly extending arm portion 946a of the member 946 is so located as to face on one side the notch 944 of the first rocking member 942. Further, a detection pin 952 hangs down from the vicinity of the end of a backwardly extending arm portion 946b of the main detecting member 946. On the other hand, the auxiliary detecting member 947 is a transversely extending plate, whose left end is so located as to face on one side the notch 945 of the second rocking member 943. The right-end side of the auxiliary detecting member 947 extends under a left arm portion 946c of the main detecting member 946 to overlap the same. A pin 951 protruding from the right-end side of the auxiliary detecting member 947 is loosely inserted in a transversely extending slot formed in the main detecting member 946. Under the overlapping portion extends a swing lever 917 with one end pivotally mounted by means of a fixing pin 916, and on both sides of the main and auxiliary detecting members 946, 947 protrude separate fixing pins 949 and 948, respectively, on which the auxiliary and main detecting members 947 and 946 are mounted respectively.

The detection pin 952 of the main detecting member 946 faces a cam groove 922 so that it may slidingly follow an eccentric cam portion 921 formed on a cam member 920 which receives driving force from a rotating body 919 drived by a motor or flywheel and rotating independently of the tape run. Integrally formed on the cam member 920 outside the cam groove 922 is an engaging projection 923 engaged with the detection pin 952 of the main detecting member 946 at the maximum-radius position. A hook portion 924 protrudes from the forward-end side of the swing lever 917. The hook portion 924 engages a pin 928 on a hook-ended hook lever 927 with its basic end portion swingably coupled to the backward end portion of a switch lever 925 by means of a pin 926. The hook lever 927 faces an engaging projection 930 integrally formed on the (rotating body) 919 so as to have its hook portion 929 get engaged with the projection 930 when it is operated, and is biased in the counterclockwise direction by a tension spring. The switch lever 925 has its central portion borne by a fixed shaft 933, and is allowed to swing round the shaft 933. The forward-end portion of the lever 925 is engaged with a projection 935 of a lock plate 934.

As is generally known, the lock plate 934 switches the operation of the tape recorder including recording, play-back, fast-forwarding and rewinding, and locks control levers 936 and 937 for driving a magnetic tape to their depressed positions, having engaging projections 934a to engage stopper portions 936a and 937a of the control levers 936 and 937. The lock plate 934 is biased in the direction of arrow H in FIG. 13 by a tension spring 939.

Referring now to FIGS. 14A to 14C, there will be described the basic operations of the tape end detecting mechanism of the above-mentioned construction. FIG. 14A shows a state of forward tape run in recording or play-back operation, while FIG. 14B shows a state of reverse tape run. In both these tape running states, the main detecting member 946 receives a force in the direction of arrow Z as illustrated, caused by the turning forces of the first and second rocking members 942 and 943. That is, in the forward tape running state, the main detecting member 946 is subjected to a Z-direction biasing force with the first fixing pin 948 as an axis of rotation by a clockwise turning force of the rocking member 942 on the take-up side. Consequently, the detection pin 952 is caused to slide on the eccentric cam portion 921 of the cam member 920, following it up inside the cam groove 922. When the tape end is reached and the tape run is stopped, the first reel holder 940 stops, so that the first rocking member 942, to which the rotation of the reel holder 940 is transmitted by means of the friction member, also stops, thereby removing the biasing force from the main detecting member 946. Accordingly, the detection pin 952 of the main detecting member 946 is guided along the cam groove 922 formed in the cam member 920, moved to the maximum-radius position as shown in FIG. 14C, and stopped by the engaging projection outside the cam groove 922. Thus, the main detecting member 946 is moved by the turning force of the cam member 920 in the direction of arrow 0 substantially at right angles to the direction of arrow Z. When the main detecting member 946 is shifted, the swing lever 917 is swinged counterclockwise round a fixed shaft 916. Thereafter, the hook lever 927 is swinged clockwise against the spring 931 to engage the hook portion 929 with the engaging projection 930 of the rotating body 919. As a result, the switch lever 925 coupled to the hook lever 927 is rocked clockwise by the turning force of the rotating body 919, thereby shifting the lock plate 934 to release an operated control lever or levers.

Hereupon, in the forward tape running operation, through the second rocking member 943 intends to rock together in the same direction (clockwise direction), it is checked by a stop 954. Thus, it will not cause any wrong operation, exerting no influence on the auxiliary detecting member 947.

On the other hand, in the case of the reverse running operation, a counterclockwise turning force of the second rocking member 943 on the take-up side, as in FIG. 14B, applies a clockwise biasing force to the auxiliary detecting member 947 with the second fixing pin 949 as the pivotal point. When the auxiliary detecting member 947 is subjected to the biasing force, the main detecting member 946 coupled therewith is swinged counterclockwise round the first fixing pin 948, thereby receiving in the end a biasing force substantially in one direction or direction of arrow Z, as is the case with the forward tape running operation. Accordingly, while the tape is running, the detection pin 952 of the main detecting member 946 slidably engages the eccentric cam portion 921 of the cam member 920 to follow it inside the cam groove 922. When the tape end is reached and the tape run is stopped, however, the biasing force is removed from the main detecting member 946 by an indirect action by means of the auxiliary detecting member 947, in the same manner as the forward tape running operation, whereby the main detecting member 946 is stopped by the engaging projection 923 of the cam member 920, and moved by the turning force of the cam member 920 to detect the tape end.

Although, in the reverse tape running operation, the first rocking member 942 intends to rock together in the counterclockwise direction, it is checked by a stop 953. Thus, it will not cause any wrong operation, exerting no influence on the main detecting member 946.

In the system of the above-described construction, the tape end may securely be detected mechanically in normal-speed recording and play-back operations in each direction, eliminating the conventional defects peculiar to reverse operation and enabling automatic stopping or switching without involving wrong operations.

Since the aforesaid system is so designed as to detect the tape end on the take-up side in both forward and reverse normal-speed tape feed states, it is immune from load fluctuations and can minimize wows. Further, it can easily prevent such trouble that the tape winds itself round the capstans or pinch rollers due to disturbance.

It is to be understood that ordinary operations are performed for fast-forwarding and rewinding.

In the aforementioned modification, the tape end is detected by using two detecting members—main and auxiliary—associated with each other which correspond, respectively, to the first and second rocking members rotating engagedly with forward and reverse tape runs, respectively, thereby biasing the main detecting member. Alternatively, however, a single detecting member may be used as shown in FIG. 15.

In this example, an inverted-L-shaped detecting member 960 is disposed between the first and second rocking members 942 and 943. The middle portion of the detecting member 960 is swingably mounted on a support pin 961 on the swing lever 917. The notch of the first rocking member 942 faces one arm portion 960a of the detecting member 960, while the notch of the second rocking member 943 faces the other arm portion 960b, the arm portions 960a and 960b bordering the support pin 961. Accordingly, the detecting member 960 is given a biasing force in the direction of arrow Z by the rocking member 942 or 943, without regard to the direction of the normal-speed tape run. Further, a cam member (detection cam) 962 is mounted eccentrically from the rotating shaft of the detecting member 960, having an outer cam portion 963 formed along the outer periphery of the cam member 962 and an innver cam portion 966 formed inside the outer cam portion across a cam groove. The inner cam portion 966 is mounted eccentrically from the rotating shaft of the cam member 962, a stopper portion 964 being formed at the maximum-radius portion in the outside face of the cam portion 966. In such modification, the detecting member 960 is subjected to the Z-direction biasing force by the turning force of the rocking member to follow the inner peripheral cam surface of the outer cam portion 963, irrespectively of the direction of the tape run. When the tape end is reached and the run is stopped, the rocking member stops to remove the biasing force from the detecting member 960, so that a detection pin 965 comes in contact with the outer peripheral cam surface of the cam portion 966 across the cam groove and stopped by the stopper portion 964. As a result, by the clockwise turning force of the cam member 962, the detecting member 960 is moved in a direction substantially at right angles to the Z-direction by means of the stopper portion 964, whereby the tape end is detected in the same manner as aforesaid.

Figure 15:
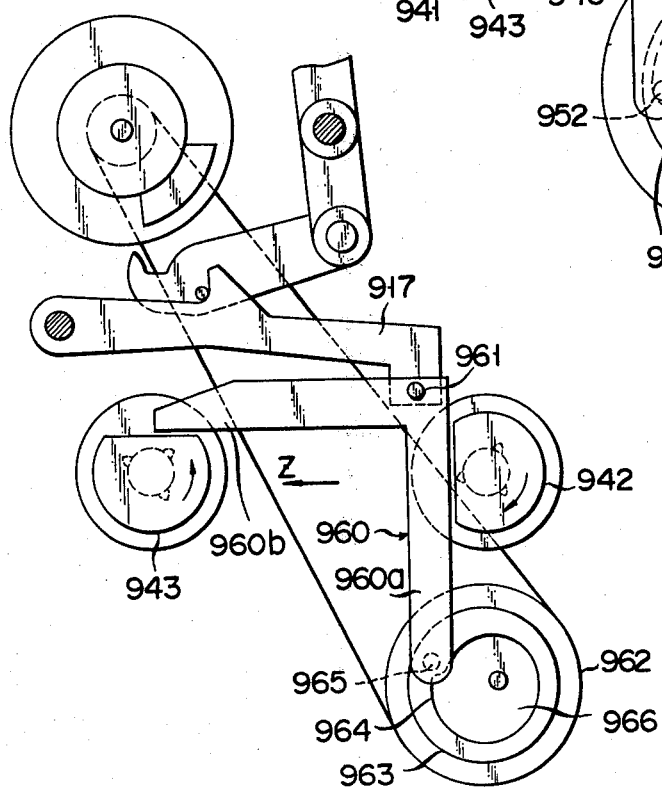

The modification as shown in FIG. 15 is more advantaged than the one shown in FIG. 13 in operating capability because it can manage with a single detecting member. The former, however, is somewhat disadvantaged in mass and thence in the biasing effect because of its stretching over the first and second rocking members, through it may provide the same satisfactory effect in actual operation without presenting any significant problems.

Figure 16:
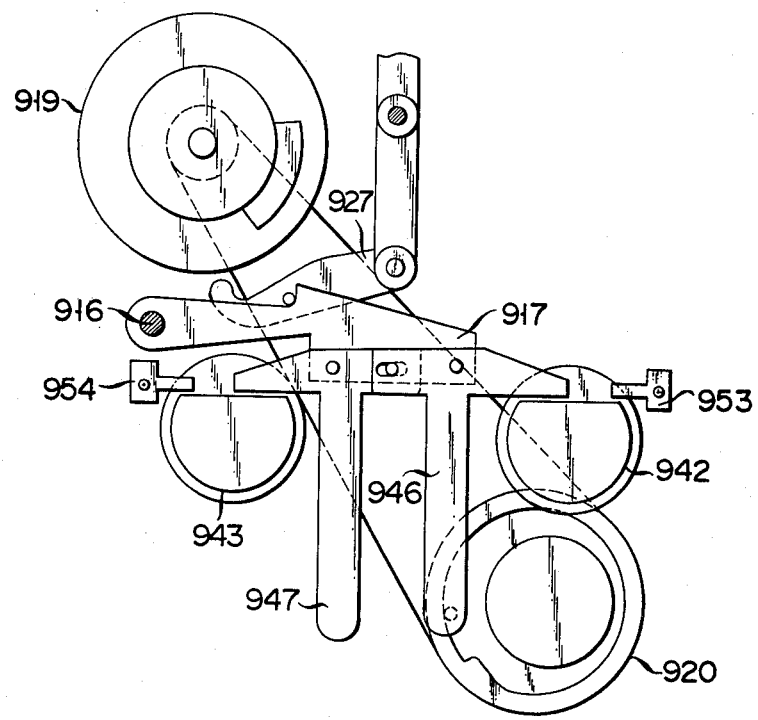

Although the modification of FIG. 13 is such that the main and auxiliary detecting members 946 and 947 have different shapes, they may otherwise be formed in substantially the same shape for balance, as shown in FIGS. 2 and 16.

In a modification as shown in FIG. 17, a detecting member 970, which receives a biasing force in the direction of arrow Z accompanying the forward and reverse tape running operations, has a U-shaped forward end portion. Between the two leg portions of the U-shaped end is a cam member 973 integrally including an eccentric sliding portion 971 and a stopper portion 972 at the maximum-radius portion, which is to be supplied with a driving force from the flywheel to rotate independently of the tape run. The detecting member 970 is so arranged as to be able to engage an engaging portion 975 of a control lever 974.

In the system of the aforementioned construction, the detecting member 970, while the tape is running, receives a biasing force to follow the cam member 973, whereby the stopper portion 972 of the cam member 973 never gets engaged with the upper leg of the U-shaped end portion of the detecting member 970. When the tape run is stopped (i.e., when the tape end is reached), the detecting member 970 is freed from the biasing force, so that it is pushed away by the cam member 973 in a direction opposite to the biasing direction to be shifted to the maximum-radius position. As a result, the stopper portion 972 of the cam member 973 gets engaged with the upper leg of the U-shaped end portion of the detecting member 970, and the control lever 974 is moved in the direction of arrow P, whereby the operation of the tape recorder will be switched.

Figure 17A:
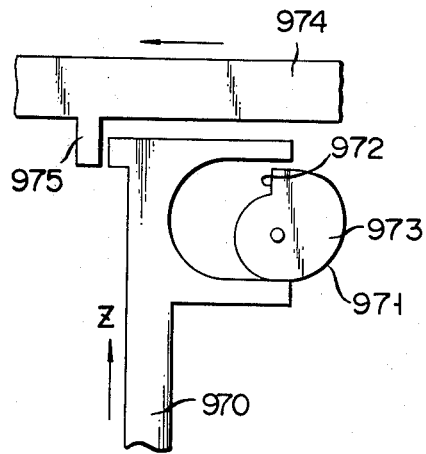
Figure 17B:
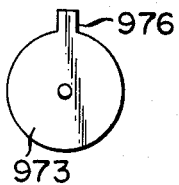
FIG. 17B is a plan view showing a modified example of cam member of the system as shown in FIG. 17A.

FIG. 17B shows a modification of the cam member 973 used in the system of FIG. 17A, in which a center of rotation is located on the center of a circular plate, a projection 976 being formed on the periphery of the plate.

What is claimed is:

1. In a tape recorder including a support base, a pair of reel holders disposed on said base and rotating in concert with a tape run, rotating members severally mounted so as to rotate together with said reel holders, a tape stop detecting mechanism for detecting a stop of rotation of one of said reel holders in one direction by means of the rotating member engaging with said one reel holder, a capstan to enable said tape run, and a head for scanning a tape; the improvement wherein said tape stop detecting mechanism detects a stop of rotation of the rotating member of the take-up side and wherein said tape stop detecting mechanism comprises:
   a detector means disposed correspondingly to both said rotating members and shifted from a non-detecting position to a detecting position when the rotation of said rotating member of the take-up side is a stopped,
   a rotation engaging member provided in association with said detector means,
   driving means for rotating the rotation engaging member in one direction, and
   engaging means for engaging said detector means with said rotation engaging member relatively to shift the same by the rotation force thereof when said detector means is shifted to said detecting position, said engaging means including
   an eccentric cam so arranged as to rotate together with said rotation engaging member,
   a detector pin on said detector means to follow said eccentric cam when said detector means is in said non-detecting position and to leave said cam to be shifted to an engaging position when said detector means is moved to said detecting position, and
   an engaging projection on said rotation engaging member to engage said detector pin when said pin is shifted to said engaging position, thereby achieving said relative shift of said detector means and rotation engaging member.

2. In a tape recorder including a support base, a pair of reel holders disposed on said base and rotating in concert with a tape run, rotating members severally mounted to rotate together with said reel holders, an automatic reverse system for detecting a stop of rotation of one of said reel holders in one direction by means of the rotating member engaging with said one reel holder and enabling said one reel holder to rotate in the other direction, a capstan to eanble said tape run, and a head for scanning a tape; the improvement wherein said automatic reverse system comprises:
   a tape stop detecting mechanism for detecting a stop of rotation of said rotating member, said tape stop detecting mechanism including
   a detector means disposed correspondingly to both said rotating members to be shifted from a non-detecting position to a detecting position when the rotation of said rotating member is stopped,
   a rotation wheel provided in association with said detector means,
   driving means for rotating the rotation engaging member in one direction, and
   an engaging means for engaging said detector means with said rotation wheel relatively to shift the same by the rotation force thereof when said detector means is shifted to said detecting position; and
   a reverse mechanism operated by the relative shift of said detector means and rotation engaging member to rotate said reel holders in said other direction.

3. A tape recorder according to claim 2, wherein said engaging means includes an eccentric cam so arranged as to rotate together with said rotation engaging member, a detector pin on said detector means to follow said eccentric cam when said detector means is in said non-detecting position and to leave said cam to be shifted to an engaging position when said detector means is moved to said detecting position, and an engaging projection on said rotation engaging member to engage said detector pin when said pin is shifted to said engaging position, thereby achieving said relative shift of said detector means and rotation engaging member.

4. A tape recorder according to claim 3, wherein said tape stop detecting mechanism includes a detection lever having a free end on which said rotation engaging member is rotatably mounted and rocked by a reaction of the engagement between said detector means and rotation engaging member as well as by the turning force of said rotation engaging member, and a control mechanism operated by a swing of said detection lever to drive said reverse mechanism.

5. A tape recorder according to claim 4, wherein said detector means includes a main detecting member disposed correspondingly to one rotating member, having a detection pin protruding therefrom, and capable of swinging from the non-detecting position to the detecting position when said one rotating member is stopped, and an auxiliary detecting member disposed correspondingly to the other rotating member and swinged by a stop of said other rotating member to swing said main detecting member to the detecting position.

6. A tape recorder according to claim 3, wherein said detector means includes a detecting member capable of swinging from the non-detecting position to the detecting position and shifted relatively to said rotating member when engaged therewith.

7. A tape recorder according to claim 2, wherein said automatic reverse system includes a motor, a normal-speed reel driving mechanism for selectively transmitting the turning force of said motor to both of said reel holders, and a capstan driving mechanism for transmitting the turning force of said motor to said capstan to rotate the capstan independently of said normal-speed driving mechanism.

8. A tape recorder according to claim 2, wherein said automatic reverse system includes forward and reverse play-back control switches, a switching member interlocked with said play-back control switches and associated with first and second movable members to locate said holders correspondingly to the operating state thereof, a reverse operation control member interlocking said switching member with said tape stop detecting mechanism to be located in a reverse position, a switching mechanism for controlling said switching member between first and second positions by means of said reverse operation control member, bringing one of said first and second movable members into operation and the other into stand-by in said first position, and bringing one of said first and second movable members into stand-by and the other into operation in said second position, and a reverse frequency control member associated with said first or second movable member and said reverse operation control member, holding on stand-by said first or second movable member that is brought into operation earlier with said tape stop detecting mechanism in operation, and shifting said reverse operation control member to a non-reverse position.

9. A tape recorder according to claim 2, wherein said automatic reverse system includes forward and reverse play-back control switches, first and second movable members severally interlocked with said play-back control switches to locate said reel holders correspondingly to the operating state thereof, a switching member associated with said first and second movable members, with both said play-back control switches operated, a switching mechanism for interlocking said switching member with said tape stop detecting mechanism to control said switching member between first and second positions, bringing one of said first and second movable members into operation and the other into stand-by in said first position, and bringing one of said first and second movable members into stand-by and the other into operation in said second position, and a head shift mechanism interlocked with said switching member to shift said head to a first or second position correspondingly to a forward or reverse track of the tape with said switching member in said first or second position thereof.

10. A tape recorder according to claim 2, wherein said automatic reverse system includes forward and reverse play-back control switches, first and second movable members severally interlocked with said play-back control switches to locate said reel holders correspondingly to the operating state thereof, a switching member associated with said first and second movable members, with both said play-back control switches operated, a switching mechanism for interlocking said switching member with said tape stop detecting mechanism to control said switching member between first and second positions, bringing one of said first and second movable members into operation and the other into stand-by in said first position, and bringing one of said first and second movable members into stand-by and the other into operation in said second position, a manual control switch, and a manual reverse mechanism for bringing said switching mechanism into a state equivalent to the operating state of said tape stop detecting mechanism with said manual reverse control switch operated 11. A tape recorder according to clam 2, wherein said automatic reverse system includes forward and reverse play-back control switches, first and second movable members severally interlocked with said play-back control switches to locate said reel holders correspondingly to the operating state thereof, a switching member associated with said first and second movable members, with both said play-back control switches operated, a switching mechanism for controlling said switching member between first and second positions by means of a reverse operation control member which interlocks said switching member with said tape stop detecting mechanism to be located in a reverse position, bringing one of said first and second movable members into operation and the other into stand-by in said first position, and bringing one of said first and second movable members into stand-by and the other into operation in said second position, a recording control switch, a third movable member interlocked with said recording control switch to locate a recording system corresponding to the operating state thereof, and a reverse frequency control member associated with said first or second movable member and said third movable member and said reverse operation control member with both said play-back control switches and said recording control switch operated, holding on stand-by said first or second movable member that is brought into operation earlier with said tape stop detecting mechanism in operation, and shifting said reverse operation control member to a non-reverse position.

12. A tape recorder according to claim 2, further comprising forward and reverse play-back control switches for driving the tape respectively in forward and reverse directions at a normal speed, a recording reproducing control switch disposed between said play-back control switches, and fast-forward and rewinding control switches disposed on the respective outer sides of said forward and reverse play-back control switches for driving the tape respectively in the forward and reverse directions at a high speed.

13. A tape recorder according to claim 2, wherein said scanning heads include a recording head capable of recording on the tape running in forward and/or reverse directions, two erasure heads disposed on both sides of said recording head respectively, a forward-reverse tape run switching mechanism, and an erasure head control mechanism interlocked with said switching mechanism to make the depth of plunge into the tape of one of said two erasure heads on the lower-course side smaller than that of the other on the upper-course side as viewed from said recording head.

14. A tape recorder according to claim 2, wherein said automatic reverse system includes a pair of flywheels rotated in opposite directions, capstans coaxially mounted on said flywheels, respectively, so as to rotate therewith, rewinding and fast-forward control switches, and a high-speed forward-reverse tape run switching mechanism of seesaw construction having at one end an engaging portion selectively interlocked with one of said control switches to be swinged clockwise or counterclockwise and to arrest the other control switch, and having at the other end a high-speed idler to be engaged with an removed from a pair of one said flywheel and one said reel holder corresponding thereto.

15. A tape recorder according to claim 2, wherein said automatic reverse system includes a normal-speed driving mechanism consisting of a motor, first and second rotating members coupled to said motor to rotate in the same direction, a normal-speed reel driving system capable of directly or indirectly engaging and removing said rotating members with and from a pair of reels for driving the tape, a pair of flywheels coupled to said motor in a system separate from said reel driving system to rotate in opposite directions, and a capstan driving system or capstans coaxially mounted on said flywheels respectively, for driving the tape.

16. A tape recorder according to claim 2, further comprising a forward-reverse tape run switching mechanism, a head base for supporting said scanning heads, a member for interlocking said head base with said forward-reverse tape run switching mechanism to move said head base in directions corresponding to said first and second positions, and a plurality of position control members arranged along the moving direction of said head base for guiding said head base, engaging therewith at two or more points, and restricting said head base to positions corresponding to said first and second positions, engaging therewith at said two points plus another point.

17. A tape recorder according to claim 16, wherein said position control member for positionally restricting said head plate at said another point is a screw for azimuth adjustment.

18. A tape recorder according to claim 2, wherein said automatic reverse system includes forward and reverse play-back control switches, first and second movable members severally interlocked with said play-back control switches to locate said reel holders correspondingly to the operating state thereof, a switching member associated with said first and second movable members, with both said play-back control switches operated, a switching mechanism for interlocking said switching member with said tape stop detecting mechanism to control said switching member between first and second positions by a turning force of a rotating body independent of the tape run, bringing one of said first and second movable members into operation and the other into stand-by in said first position, and bringing one of said first and second movable members into standby and the other into operation in said second position, and a power switch for a motor having elastic contacts that are interlocked with both said play-back control switches to be closed and are interlocked with an automatic shut-off mechanism or a stop control switch to be opened, and applying a turning force to said rotating body so that said elastic contacts get engaged with said switching member in said first or second position thereof to be kept closed after said contacts are opened by said automatic shut-off mechanism or stop control switch and to be opened after said switching member is moved to said first or second position by the elasticity of said elastic contacts.

* * * * *